United States Patent
Zhang et al.

(10) Patent No.: US 12,432,352 B2
(45) Date of Patent: Sep. 30, 2025

(54) BIT-LENGTH CONTROL FOR LINEAR REGRESSION-BASED AFFINE MERGE CANDIDATE DERIVATION

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 183 days.

(21) Appl. No.: 18/481,590

(22) Filed: Oct. 5, 2023

(65) Prior Publication Data
US 2024/0137524 A1 Apr. 25, 2024

Related U.S. Application Data

(60) Provisional application No. 63/379,555, filed on Oct. 14, 2022.

(51) Int. Cl.
H04N 19/136 (2014.01)
H04N 19/149 (2014.01)
(Continued)

(52) U.S. Cl.
CPC ......... *H04N 19/149* (2014.11); *H04N 19/136* (2014.11); *H04N 19/176* (2014.11); *H04N 19/184* (2014.11)

(58) Field of Classification Search
None
See application file for complete search history.

(56) References Cited

U.S. PATENT DOCUMENTS

2005/0111548 A1* 5/2005 Lee .................. H04N 19/42
                                                     375/240.18
2021/0274209 A1* 9/2021 He .................... H04N 19/52
(Continued)

OTHER PUBLICATIONS

Chen J., et al., "Algorithm Description for Versatile Video Coding and Test Model 9 (VTM 9)", 130. MPEG Meeting, Apr. 20, 2020-Apr. 24, 2020, Alpbach, (Motion Picture Expert Group or ISO/IEC JTC1/SC29/WG11), No. m53984, 18th JVET Meeting, JVET of ITU-T SG 16 WP 3 and ISO/IEC JTC 1/SC 29/WG 11, Apr. 15-24, 2020, JVET-R2002-v2, Jun. 15, 2020 (Jun. 15, 2020), XP030289596, 97 Pages.

(Continued)

*Primary Examiner* — Christopher G Findley
(74) *Attorney, Agent, or Firm* — Shumaker & Sieffert, P.A.

(57) ABSTRACT

An example device for coding video data includes memory configured to store the video data and one or more processors communicatively coupled to the memory. The one or more processors are configured to reduce a bit length of one or more input variables for a linear regression operation to generate one or more reduced bit length input variables, the input variables including at least one of a) one or more delta coordinates, b) one or more delta motion vectors, or c) a value representing a number of subblocks. The one or more processors are configured to perform the linear regression operation and derive an affine motion model based on the performing the linear regression on the one or more reduced bit length input variables. The one or more processors are configured to code a current block of the video data based on the affine motion model.

50 Claims, 17 Drawing Sheets

(51) Int. Cl.
  *H04N 19/176*  (2014.01)
  *H04N 19/184*  (2014.01)

(56) References Cited

U.S. PATENT DOCUMENTS

| | | | | |
|---|---|---|---|---|
| 2021/0385483 | A1* | 12/2021 | Liu | H04N 19/513 |
| 2022/0078488 | A1* | 3/2022 | Leleannec | H04N 19/52 |
| 2022/0150506 | A1* | 5/2022 | Luo | H04N 19/176 |
| 2022/0210462 | A1* | 6/2022 | Luo | H04N 19/182 |
| 2022/0239943 | A1* | 7/2022 | Xiu | H04N 19/139 |
| 2023/0011286 | A1* | 1/2023 | Chen | H04N 19/197 |
| 2023/0291927 | A1* | 9/2023 | Luo | H04N 19/167 |
| 2024/0015305 | A1* | 1/2024 | Zhao | H04N 19/186 |
| 2024/0064311 | A1* | 2/2024 | Astola | H04N 19/176 |
| 2024/0129480 | A1* | 4/2024 | Yang | H04N 19/54 |

OTHER PUBLICATIONS

Chen W., et al., "AHG12: Non-Adjacent Spatial Neighbors for Affine Merge Mode", JVET-X0151-v2, Joint Video Experts Team (JVET) of ITU-T SG 16 WP 3 and ISO/IEC JTC 1/SC 29, 24th Meeting, by teleconference, Oct. 6-15, 2021, pp. 1-4.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54.

Ghaznavi-Youvalari R., et al., "Regression-Based Motion Vector Field for Video Coding", IEEE Transactions on Circuits and Systems for Video Technology, IEEE, USA, vol. 31, No. 5, Sep. 18, 2019, XP011852711, Retrieved: May 4, 2021, pp. 2034-2038.

ITU-T H.265: "Series H: Audiovisual and Multimedia Systems Infrastructure of Audiovisual Services—Coding of Moving Video", High Efficiency Video Coding, the International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, the International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Zhang K., et al., "EE2-3.12-Related: Extensions of History-Parameter-Based Affine Model Inheritance", JVET-Y0161-v3, Joint Video Experts Team (JVET) of ITU-T SG 16 WP 3 and ISO/IEC JTC 1/SC 29, 25th Meeting, by teleconference, Jan. 12-21, 2022, pp. 1-4.

Zhang Y., et al., "AHG12: On Bit Length Control of Regression Based Affine Merge Candidate Derivation", Joint Video Experts Team (JVET) of ITU-T SG 16 WP 3 and ISO/IEC JTC 1/SC 29, JVET-AB0189-v3, 28th Meeting, Mainz, DE, Oct. 21-28, 2022, pp. 1-4.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

Anonymous: "Outlier—Wikipedia", Jul. 17, 2022, pp. 1-9, XP093117620, the whole document.

Anonymous: "Winsorizing—Wikipedia", Sep. 25, 2022, pp. 1-3, XP093117627, the whole document.

Chen W., et al., "EE2-3.11: Non-adjacent Spatial Neighbors for Affine Merge Mode", 25. JVET Meeting, Teleconference, (The Joint Video Exploration Team of ISO/IEC JTC1/SC29/WG11 and ITU-T SG. 16) No. JVET-Y0153-v2, Nov. 12, 2022-Dec. 1, 2022, Jan. 6, 2022, 4 Pages, XP030300524, the whole document.

Ghaznavi-Youvalari R., et al., "CE2: Merge Mode with Regression-Based Motion Vector Field (Test 2.3.3)", JVET-M0302, Joint Video Experts Team (JVET) of ITU-T SG 16 WP 3 and ISO/IEC JTC 1/SC 29/WG 11, 13th Meeting: Marrakech, MA, No. JVET-M0302, Jan. 9, 2019-Jan. 18, 2019, Jan. 2, 2019, XP030200275, 5 pages, abstract section 2 figures 1,2.

Ghaznavi-Youvalari R., et al., "CE4-related: Merge Mode with Regression Based Motion Vector Field (RMVF)", JVET-L0171, 12 Meeting, , Macao, CN, Oct. 3, 2018-Oct. 12, 2018, the Joint Video Exploration Team of ISO/IEC JTC1/SC29/WG11 and ITU-T SG. 16, No. JVET-L0171, Oct. 6, 2018, pp. 1-4, XP030195051, XP030192801, Section 2.

International Search Report and Written Opinion—PCT/US2023/076189—ISA/EPO—Jan. 24, 2024 15 Pages.

Seber G A.F., et al., "Chapter 3 Linear Regression: Estimation and Distribution Theory", In: "Linear Regression Analysis", Jan. 1, 2003, Wiley Sons, Inc, Hoboken, NJ, USA, XP093117572, pp. 35-93, pp. 35-42, paragraph 3.1 pp. 69-72, paragraph 3.11—paragraph 3.11.2.

Zhang Y., et al., "EE2-Related: Regression Based Affine Candidate Derivation", JVET-Z0125-v2, Joint Video Experts Team (JVET) of ITU-T SG 16 WP 3 and ISO/IEC JTC 1/SC 29/WG11 and ITU-T SG.16, 26th Meeting, by teleconference, No. JVET-Z0125, m59457, Apr. 20, 2022-Apr. 29, 2022, Apr. 25, 2022, XP030300993, XP030300992, pp. 1-5, sections 1 and 2 p. 1, figure 1.

* cited by examiner

BIT-LENGTH CONTROL FOR LINEAR REGRESSION-BASED AFFINE MERGE CANDIDATE DERIVATION

This application claims the benefit of U.S. Provisional Patent Application 63/379,555, filed Oct. 14, 2022, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for bit length control for linear regression-based affine merge candidate derivation. For example, techniques described herein may apply bit length control to input variables and intermediate results so as to meet a commonly defined bit-length threshold, for example, for hardware implementation of video coders (e.g., video encoders and/or video decoders). A video coder may use a number of different determinations and calculations to encode and/or decode video data. When implementing such a video coder in hardware, it may be impractical or impossible to successfully implement the video coder without constraint(s) on the bit length of input values and/or intermediate values. For example, without limiting bit length, certain determinations and/or calculations may cause data overflows. As such, it may be desirable to keep the bit length of values in a hardware implemented video coder to 64 bits or below such that the video coder may be successfully implemented in hardware. This disclosure describes techniques to control the bit length of inputs and intermediate values for linear regression based affine merge candidate derivation.

In one example, a method includes: controlling a bit length of input variables for a linear regression operation, the input variables comprising at least one of a) one or more delta coordinates, b) one or more delta motion vectors, or c) a value representing a number of subblocks; performing the linear regression operation on controlled bit length input variables; deriving an affine motion model based on performing the linear regression operation; and coding a current block of the video data based on the affine motion model.

In another example, a device includes memory configured to store video data, and one or more processors communicatively coupled to the memory, the one or more processors being configured to: control a bit length of input variables for a linear regression operation, the input variables comprising at least one of a) one or more delta coordinates, b) one or more delta motion vectors, or c) a value representing a number of subblocks; perform the linear regression operation on controlled bit length input variables; derive an affine motion model based on the performing the linear regression operation; and code a current block of the video data based on the affine motion model.

In another example, a device includes: means for controlling a bit length of input variables for a linear regression operation to generate one or more reduced bit length input variables, the one or more input variables comprising at least one of a) one or more delta coordinates, b) one or more delta motion vectors, or c) a value representing a number of subblocks; means for performing the linear regression operation on controlled bit length input variables; means for deriving an affine motion model based on performing the linear regression operation; and means for coding a current block of the video data based on the affine motion model.

In another example, a computer-readable storage medium is encoded with instructions that, when executed, cause one or more programmable processors to: control a bit length of input variables for a linear regression operation to generate one or more reduced bit length input variables, the input variables comprising at least one of a) one or more delta coordinates, b) one or more delta motion vectors, or c) a value representing a number of subblocks; perform the linear regression operation on controlled bit length input variables; derive an affine motion model based on the performing the linear regression operation; and code a current block of the video data based on the affine motion model.

The details of one or more examples are set forth in the accompanying drawings and the description below. Other features, objects, and advantages will be apparent from the description, drawings, and claims.

DETAILED DESCRIPTION

Some video coding techniques are defined to employ bit lengths that may be impractical or impossible to be implemented in hardware, for example when performing linear regression-based affine merge candidate derivation. As such, techniques described herein may apply bit length control to input variables and/or intermediate results so as to meet a commonly defined bit-length threshold, for example, for hardware implementation of video coders (e.g., video encoders and/or video decoders). The commonly defined bit-length threshold may be a threshold that is practical to implement in a hardware-based video coder. Defining a common bit-length threshold may be desirable as not limiting the bit length for input variables and/or intermediate results may result in data overflows. Different implementations may address data overflows in different manners, which may cause one decoder to decode the same encoded video data in a manner differently than that of another decoder. Therefore, it may be desirable to limit a bit length of input variables and/or intermediate results so as to meet a commonly defined bit-length threshold.

As such, this disclosure describes techniques to keep the bit length of values used in linear regression based affine merge candidate derivation from exceeding the commonly defined bit-length threshold, thus facilitating hardware implementation of such video coders. Hardware implementation may be desirable over software implementation, such as in a mobile device, as a hardware implementation may be more processing power efficient than a software implementation.

Figure 1:
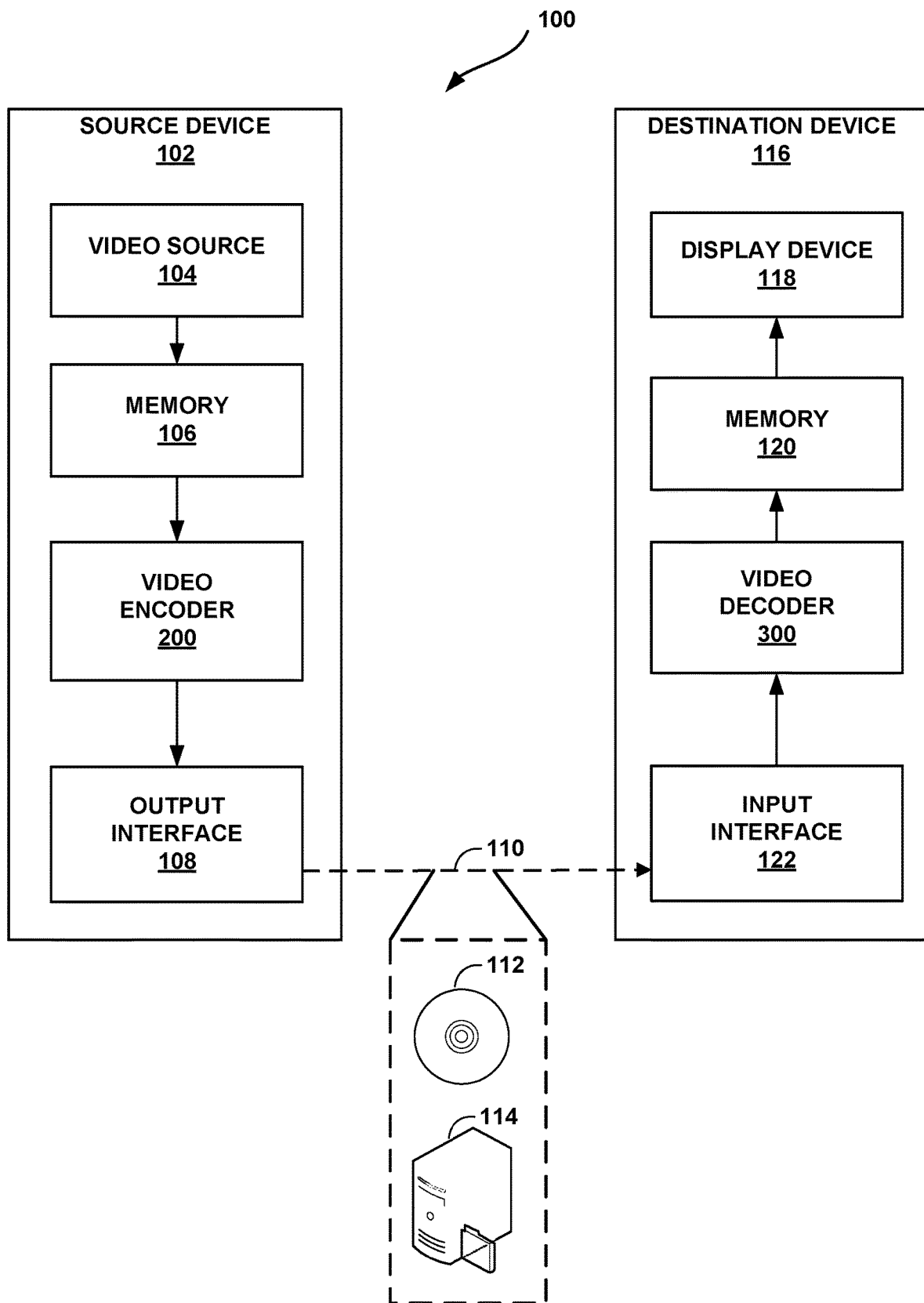
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for bit length control solutions for linear regression-based affine merge candidate derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for bit length control solutions for linear regression-based affine merge candidate derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use linear regression-based affine merge candidate derivation. For example, bit length control techniques disclosed herein may be used to meet a commonly defined bit-length threshold.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTB s is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a video coder, such as video encoder 200 or video decoder 300 may control (e.g., reduce or limit) a bit length of input variables for a linear regression operation; perform the linear regression operation on controlled bit length input variables; derive an affine motion model based on the performing the linear regression operation; and code a current block of the video data based on the affine motion model.

Versatile Video Coding (VVC) (see, e.g., J. Chen, Y. Ye and S.-H. Kim, "Algorithm description for Versatile Video Coding and Test Model 9 (VTM 9)," Joint Video Experts Team (JVET) of ITU-T SG 16 WP 3 and ISO/IEC JTC 1/SC 29/WG 11, 18$^{th}$ Meeting: by Teleconference, 15-24 Apr. 2020, JVET-R2002), a recent video coding standard, was developed by the Joint Video Experts Team (JVET) of ITU-T and ISO/IEC to achieve substantial compression capability beyond HEVC for a broader range of applications. The VVC specification was finalized in July 2020 and published by both ITU-T and ISO/IEC. The VVC specification specifies normative bitstream and picture formats, high level syntax (HLS) and coding unit level syntax, and the parsing and decoding process. VVC also specifies profiles/tiers/levels (PTL) restrictions, byte stream format, a hypothetical reference decoder and supplemental enhancement information (SEI) in an annex.

Beginning in April 2021, JVET has been developing an Enhanced Compression Model (ECM) software (see, e.g., M. Coban, F. L. Léannec and J. Ström, "Algorithm description for Enhanced Compression Model 2 (ECM 2)," Joint Video Experts Team (JVET) of ITU-T SG 16 WP 3 and ISO/IEC JTC 1/SC 29/WG 11, 23$^{rd}$ Meeting: by Teleconference, 7-16 Jul. 2021, JVET-W2025) to enhance compression capability beyond VVC. The set of coding tools in the ECM software encompasses all functional blocks in a hybrid video coding framework (e.g., a video coding framework using prediction), including intra prediction, inter prediction, transform and coefficient coding, in-loop filtering, and entropy coding. The techniques of this disclosure may be applied to ECM, state of the art video codecs such as VVC, AV1, etc., and/or future video codecs.

Figure 2A:
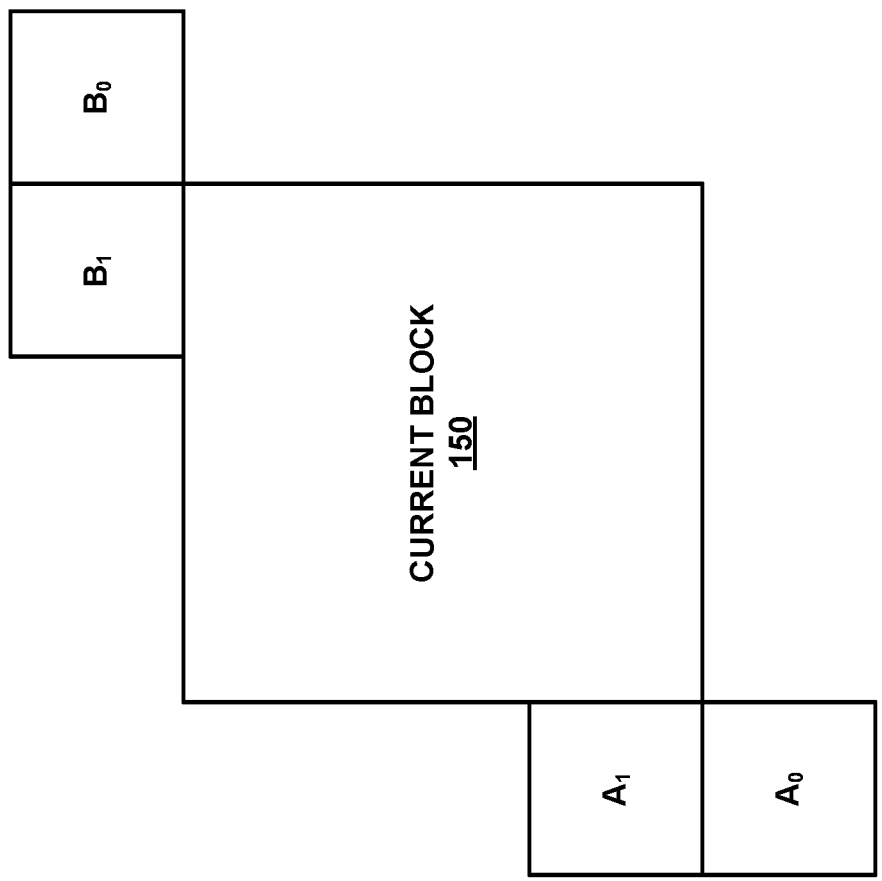
FIGS. 2A-2B are conceptual diagrams illustrating an example of subblock-based temporal motion vector prediction.
Figure 2B:
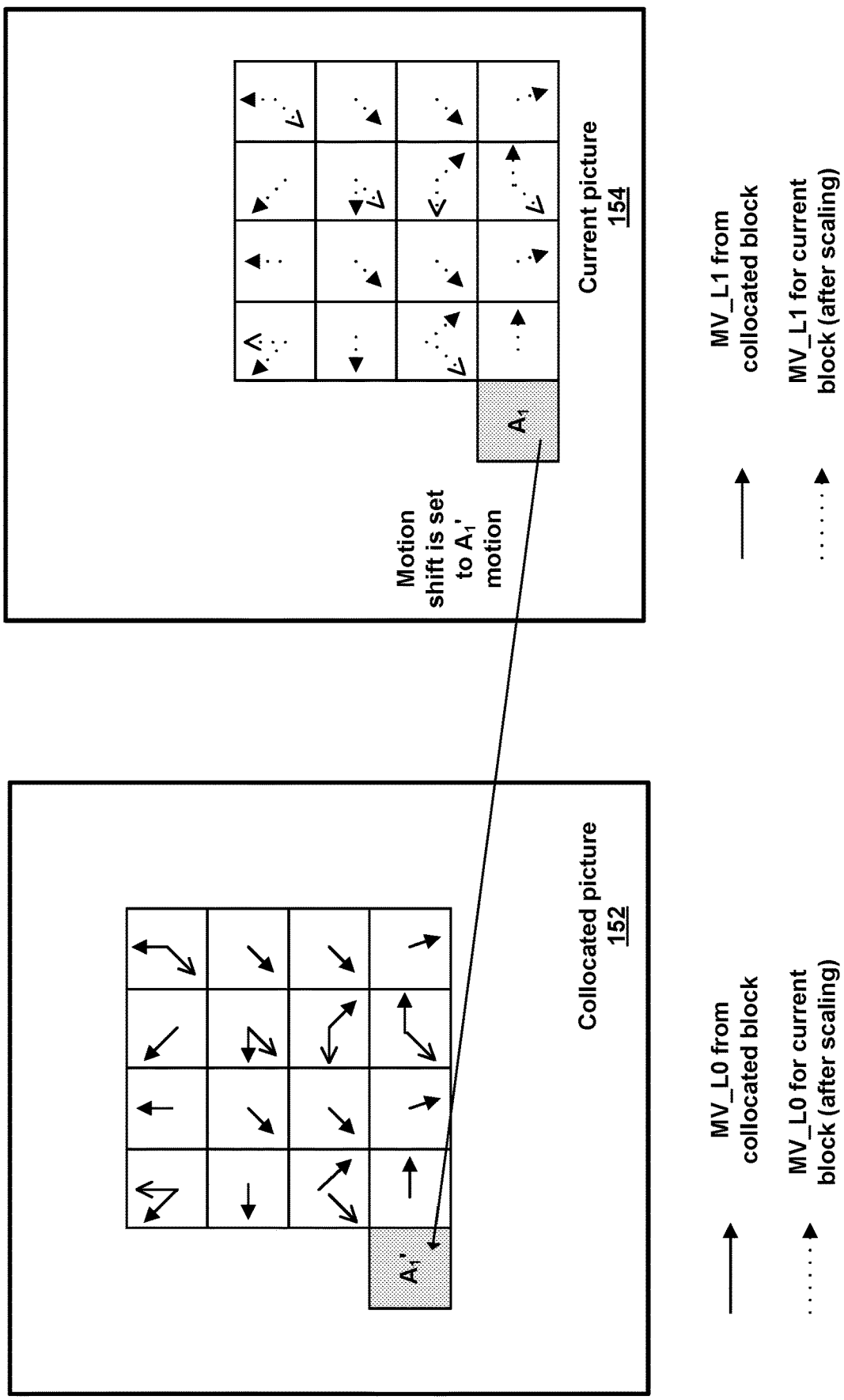

FIGS. 2A-2B are conceptual diagrams illustrating an example of subblock-based temporal motion vector prediction (SbTMVP). SbTMVP predicts the motion vectors of sub-CUs (e.g., subblocks) within a current CU as illustrated in FIGS. 2A-2B. First, video encoder 200 or video decoder 300 may examine the spatial neighbor A1 of current block 150 in FIG. 2A. If A1 has a motion vector that uses the collocated picture as its reference picture, this motion vector is selected to be the motion shift that is to be applied. If no such motion is identified, then the motion shift is set to (0, 0). For example, video encoder 200 or video decoder 300 may determine whether A1 has a motion vector that uses the collocated picture as its reference picture and select a motion shift based on the determination.

Second, the motion shift identified above is added to the coordinates of the current block of the current picture 154 to obtain sub-CU-level motion information (motion vectors and reference indices) from the collocated picture 152 as shown in FIG. 2B. For example, video encoder 200 or video decoder 300 may add the motion shift to the coordinates of the current block. The example in FIG. 2B assumes the motion shift is set to the motion of block A1. After the motion information of the collocated sub-CU is identified, video encoder 200 or video decoder 300 may convert the motion information to motion vectors and reference indices of the current sub-CU in a similar way as the TMVP (temporal motion vector prediction) process of VVC, where temporal motion scaling is applied to align the reference pictures of the temporal motion vectors to those of the current CU.

The SbTMVP predictor is added as the first entry to the list of subblock based merge candidates, and is followed by the affine merge candidates. SbTMVP differs from TMVP in the following two aspects: TMVP predicts motion at CU level but SbTMVP predicts motion at sub-CU level. Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU. For example, video encoder 200 or video decoder 300 may determine an SbTMVP predictor and add such a predictor as the first entry of the list of subblock based merge candidates.

A subblock merge candidate list is now discussed. The following four types of subblock merge candidates are used to form the subblock merge candidate list, where the first entry is an SbTMVP, and the other entries are Affine merge candidates. The determination of an SbTMVP is described above.

Inherited affine merge candidates (I-AffineMVP) that are extrapolated from the CPMVs (control point motion vectors) of the neighbor CUs may also be used in the subblock merge candidate list. There are a maximum two inherited affine candidates in the subblock merge candidate list, which are derived from an affine motion model of the neighboring blocks, for example, one from left neighboring CUs and one from above neighboring CUs. For example, video encoder 200 or video decoder 300 may determine inherited affine candidates and add up to two such candidates in the subblock merge candidate list.

Figure 3:
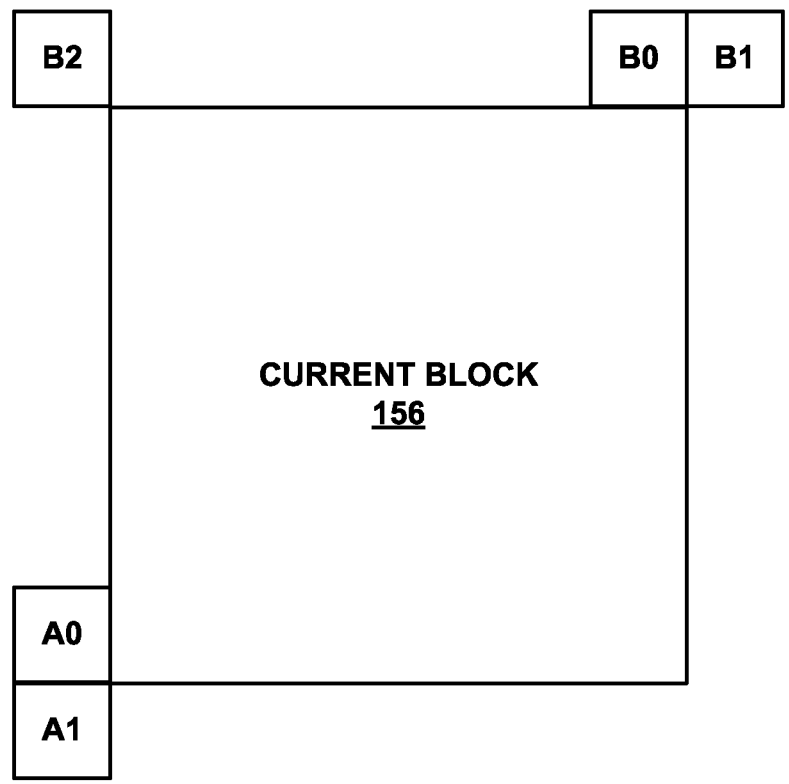
FIG. 3 is a conceptual diagram illustrating example positions of spatial inherited affine merge candidates.

FIG. 3 is a conceptual diagram illustrating example positions of spatial inherited affine merge candidates. The candidate block positions are shown in FIG. 3 for a current block 156. For the left predictor, the scan order is A0→A1, and for the above predictor, the scan order is B0→B1→B2. Only the first inherited candidate from each group is selected. No pruning check is performed between two inherited candidates. When a neighboring affine CU that contains the scanning position is identified, the control point motion vectors (CPMVs) from the identified affine CU are used to derive the CPMVs of an affine merge candidate of the current CU (e.g., current block 156).

Video encoder 200 or video decoder 300 may also add constructed affine merge candidates (C-AffineMVP) that are derived using the translational MVs of the neighbor CUs to the subblock merge candidate list. A constructed affine candidate means the candidate is constructed by combining the neighbor translational motion information of each control point.

Figure 4:
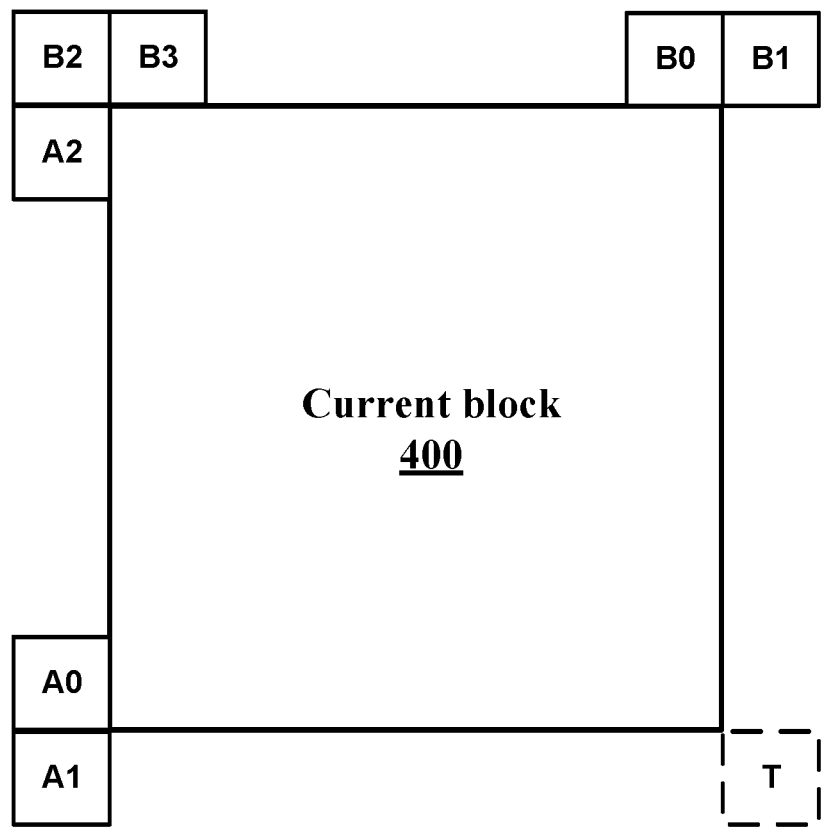
FIG. 4 is a conceptual diagram illustrating example locations of candidate positions for constructed affine merge mode.

FIG. 4 is a conceptual diagram illustrating example locations of candidate positions for constructed affine merge mode. The motion information for the control points is derived from the specified spatial neighbors and temporal neighbor of a current block 400 shown in FIG. 4. CPMVk (k=1, 2, 3, 4) represents the k-th control point. For CPMV1, the B2→B3→A2 blocks are checked and the MV of the first available block is used. For CPMV2, the B1→B0 blocks are checked and for CPMV3, the A1→A0 blocks are checked. TMVP is used as CPMV4 if TMVP is available. The following combinations of control point MVs are used to construct affine merge candidates in a given order with at most 6 different candidates: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}. The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs may be discarded.

Video encoder 200 or video decoder 300 may also add zero MVs to the subblock merge candidate list, after inherited affine merge candidates and constructed affine merge candidate are checked, if the list is not full. Zero MVs are inserted until the list is full.

Adaptive reordering of merge candidates (ARMC) is now discussed. In ECM, the merge candidates are adaptively reordered through the use of template matching (TM). The reordering technique is applied to a regular merge candidate list, TM merge candidate list, and affine merge candidate list (e.g., the subblock merge candidate list, excluding the SbTMVP candidate). For the TM merge mode, merge candidates are reordered before the TM refinement process.

After a merge candidate list is constructed, merge candidates are divided into several subgroups. For example, video encoder 200 or video decoder 300 may divide the merge candidates into subgroups. The subgroup size is set to 5 for regular merge mode and TM merge mode. The subgroup size is set to 3 for affine merge mode. Merge candidates in each subgroup are reordered ascendingly according to cost values based on TM. For simplification, merge candidates in the last, but not the first subgroup, are not reordered.

The TM cost of a merge candidate may be measured by the sum of absolute differences (SAD) between samples of a template of the current block and their corresponding reference samples, as one example. The template comprises a set of reconstructed samples neighboring to the current block. Reference samples of the template are located by the motion information of the merge candidate.

Figure 5:
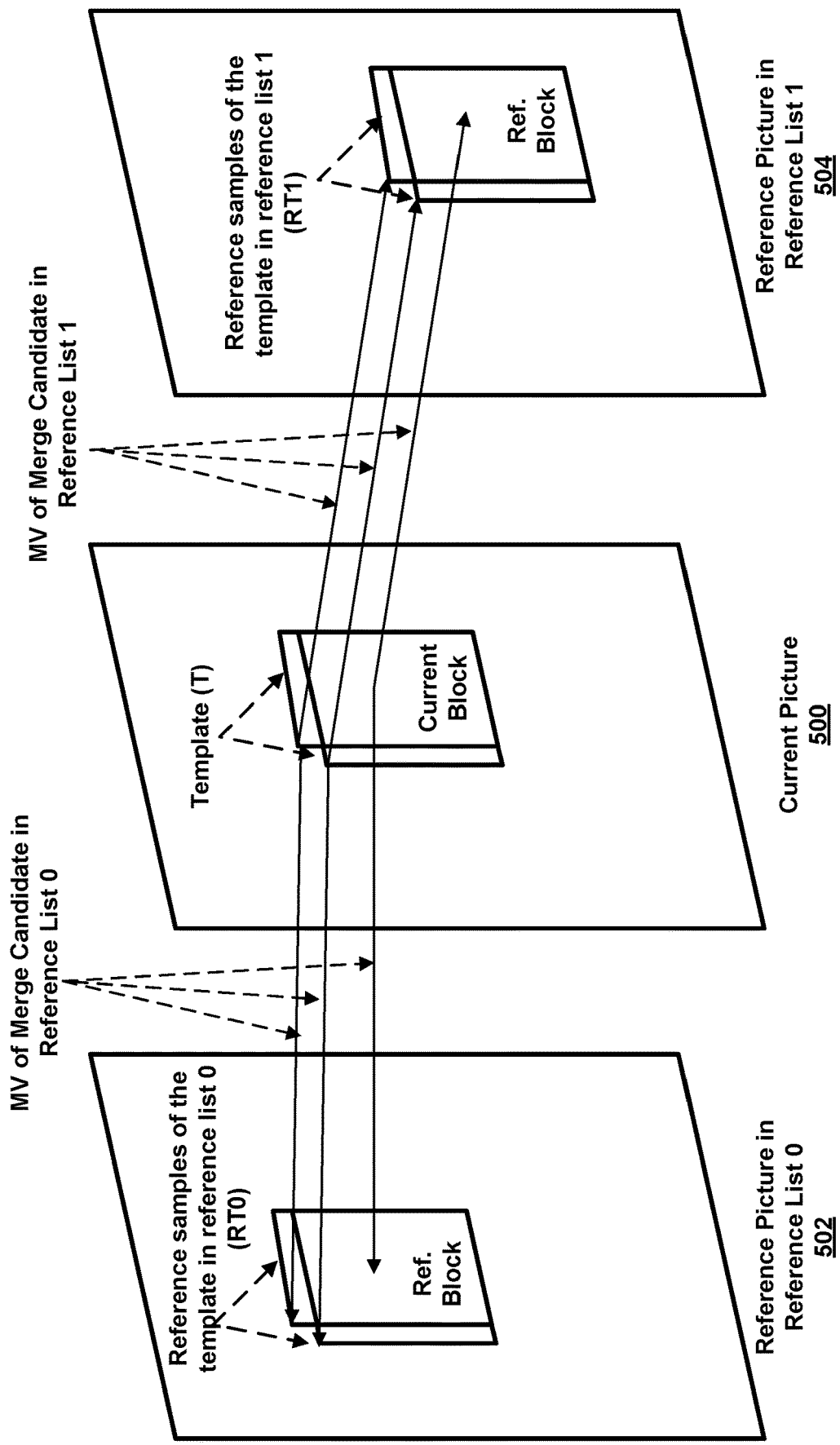
FIG. 5 is a conceptual diagram illustrating an example template and example reference samples of the template in reference pictures.
Figure 6:
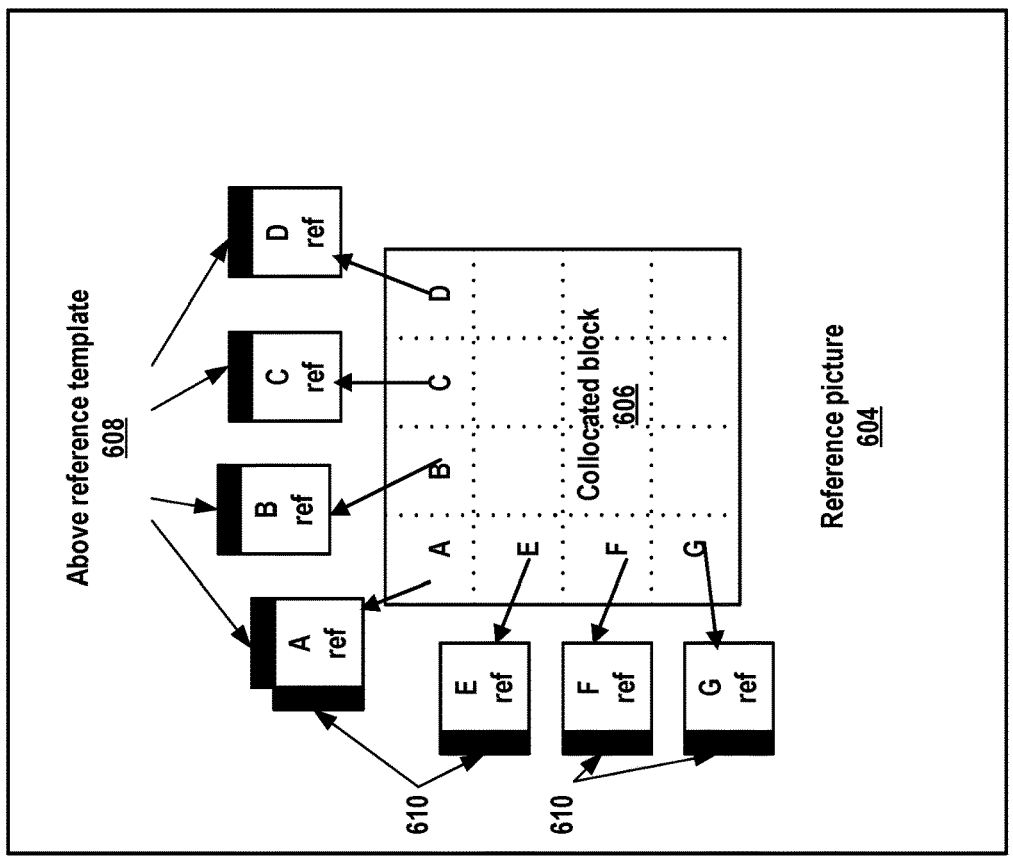
FIG. 6 is a conceptual diagram illustrating an example template and example reference samples of the template for a block with subblock motion using the motion information of the subblocks of a current block.
Figure 6:
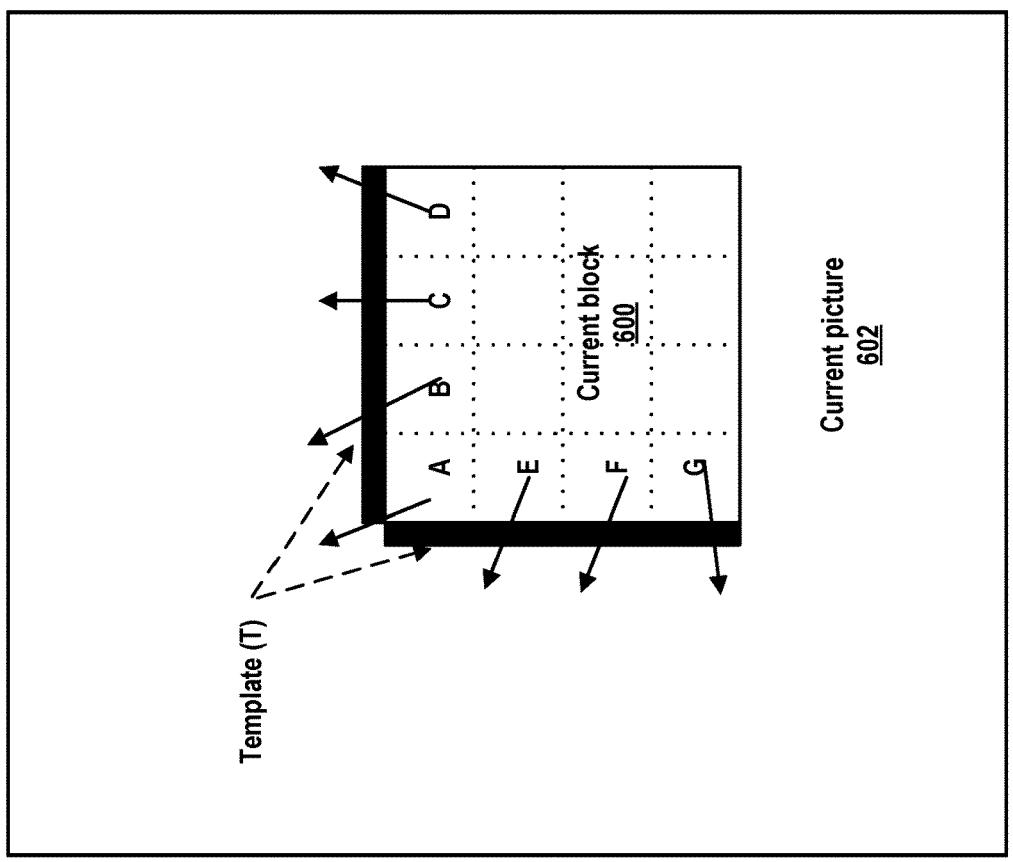

FIG. 5 is a conceptual diagram illustrating an example template and example reference samples of the template in reference pictures. When a merge candidate of a current block of current picture 500 utilizes bi-directional prediction (e.g., has a reference picture in reference list 0 502 and reference picture in reference list 1 504), the reference samples of the template of the merge candidate are also generated by bi-prediction as shown in FIG. 5. For subblock-based merge candidates with subblock size equal to Wsub×Hsub, the above template comprises several sub-templates with the size of Wsub×1, and the left template comprises several sub-templates with the size of 1×Hsub. As shown in FIG. 6, the motion information of the subblocks in the first row and the first column of current block is used to derive the reference samples of each sub-template. For example, video encoder 200 or video decoder 300 may use bi-prediction and derive reference samples of each sub-template.

FIG. 6 is a conceptual diagram illustrating an example template and example reference samples of the template for a current block with subblock motion using the motion information of the subblocks of a current block. A current picture 602 includes current block 600. A collocated picture 604 includes a collocated block 606. For subblock-based merge candidates with subblock size equal to Wsub×Hsub, the above template comprises several sub-templates 608 with the size of Wsub×1, and the left template comprises several sub-templates 610 with the size of 1×Hsub. As shown in FIG. 6, the motion information of the subblocks in the first row and the first column of current block 600 is used to derive the reference samples of each sub-template.

Figure 7:
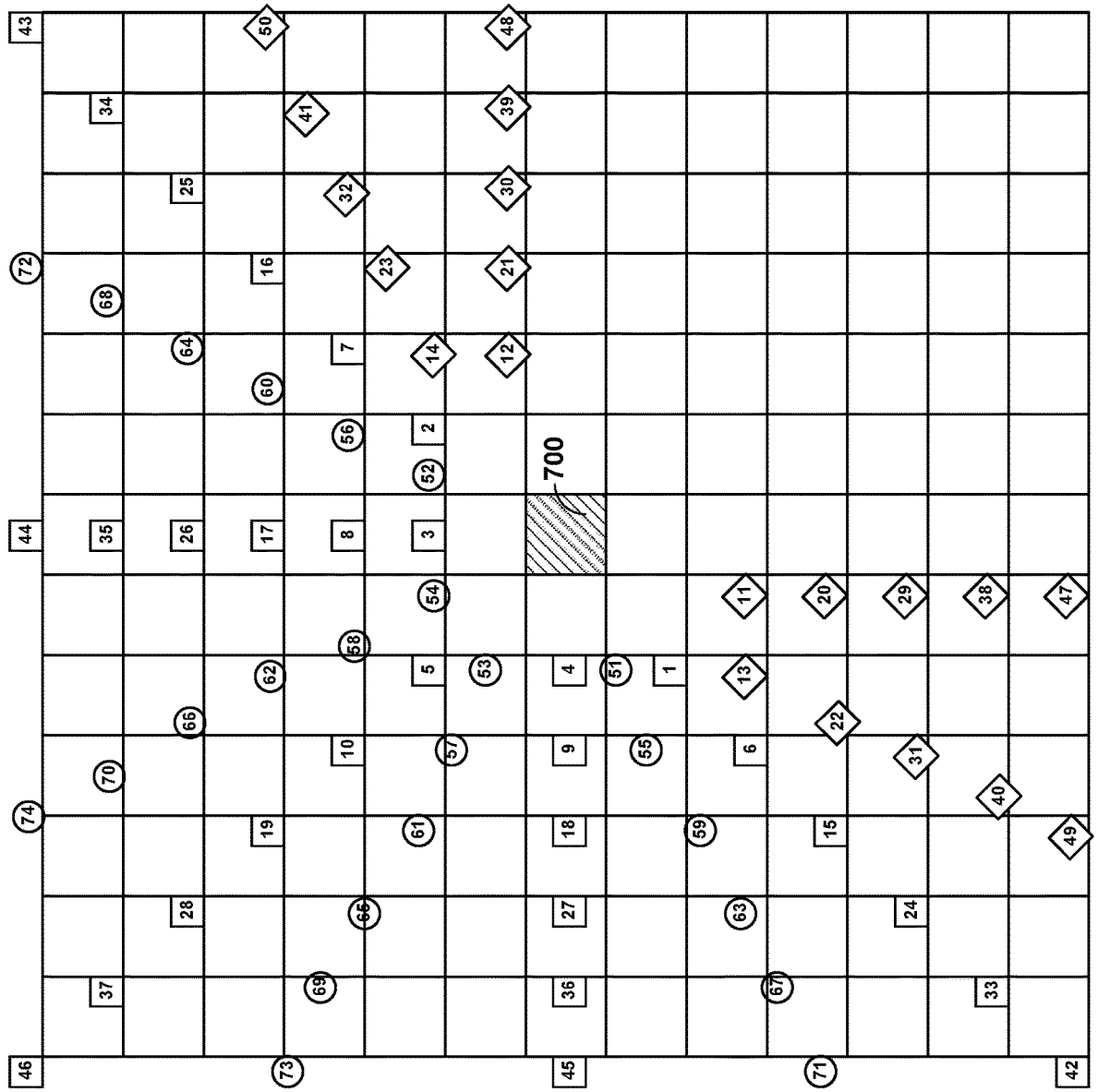
FIG. 7 is a conceptual diagram illustrating example non-adjacent spatial neighboring blocks used to derive non-adjacent affine candidates.

FIG. 7 is a conceptual diagram illustrating example non-adjacent spatial neighboring blocks used to derive non-adjacent affine candidates. Non-adjacent affine merge candidates are now discussed. Currently, in the regular merge list construction process of ECM, non-adjacent merge candidates are added as a new category of regular merge candidates. For example, a non-adjacent merge candidate is a merge candidate that is not adjacent to current block 700. A non-adjacent merge candidate scan pattern, as shown in FIG. 7, is used to search for non-adjacent merge candidates. Non-adjacent merge candidates may be useful in improving the regular merge mode performance. Hence, video encoder 200 or video decoder 300 may search for non-adjacent affine CU and add non-adjacent affine merge candidates to the sub-block merge candidate list to further improve the performance of the sub-block merge mode. In some examples, video encoder 200 or video decoder 300 may reuse the same non-adjacent merge scan pattern to instead search for non-adjacent affine CUs. The scanning order may follow the index as denoted in the FIG. 7 in ascending order. After a non-adjacent affine CU is found, video encoder 200 or video decoder 300 may directly derive the non-adjacent affine CU's CPMVs from the non-adjacent position to the current CU position or use the motion vector field of the non-adjacent affine CU to derive the affine model of the current CU through the linear regression process.

Figure 8:
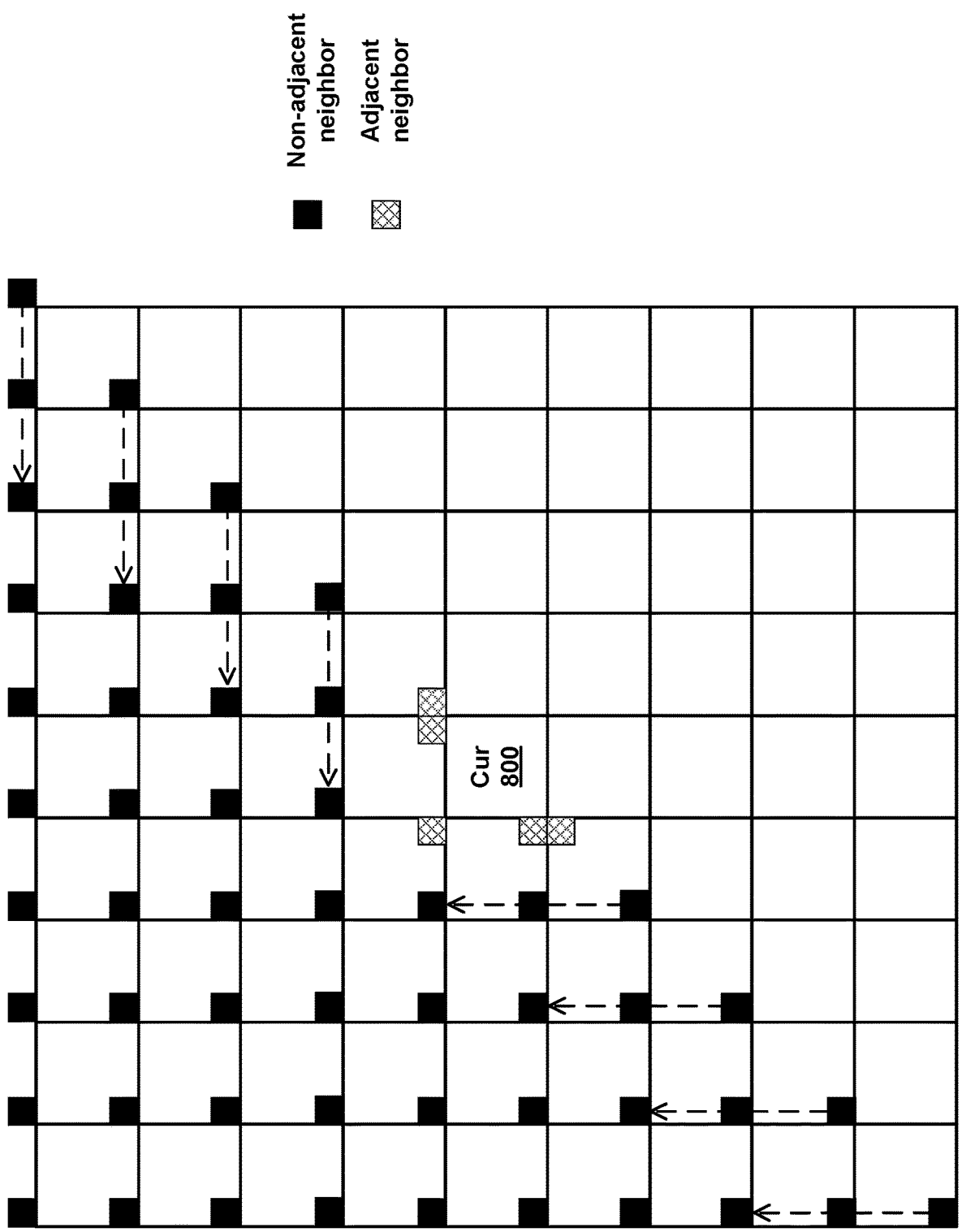
FIG. 8 is a conceptual diagram illustrating other example non-adjacent spatial neighboring blocks used to derive non-adjacent affine candidates.

FIG. 8 is a conceptual diagram illustrating other example non-adjacent spatial neighboring blocks used to derive non-adjacent affine candidates. The extension of non-adjacent merge candidates to non-adjacent affine merge candidates has been proposed in the JVET-X meeting and there can be various design for the scanning pattern. In W. Chen, X. Xiu, Y.-W. Chen, H.-J. Jhu, C.-W. Kuo, N. Yan and X. Wang, "AHG12: Non-adjacent spatial neighbors for affine merge mode", JVET-X0151, October 2021, a different scan pattern from that of FIG. 7 is described, as shown in FIG. 8.

The scanning order may follow what is depicted in FIG. 8. For example, non-adjacent affine CU may follow the scanning order of FIG. 8. The non-adjacent spatial neighbor blocks of current block 800 are checked based on their distances to current block 800, i.e., from near, to far. At a specific distance, video encoder 200 or video decoder 300 may scan from right to left, horizontally, and bottom to top, vertically.

By using either of the scan patterns mentioned above, non-adjacent affine CU(s) may be identified, and their corresponding motion vector field(s) may potentially be used as the input to the linear regression process to derive an affine model of the current CU.

History-based affine merge candidates are now discussed. History merge candidates were introduced during the VVC standardization process which buffers the motion vectors of previously decoded CUs and uses them for the motion vector prediction of current CU. Similar to the extension of non-adjacent merge candidates to non-adjacent affine merge candidates, the concept of the history-based merge candidates can also be extended to history-based affine merge candidates.

Figure 9:
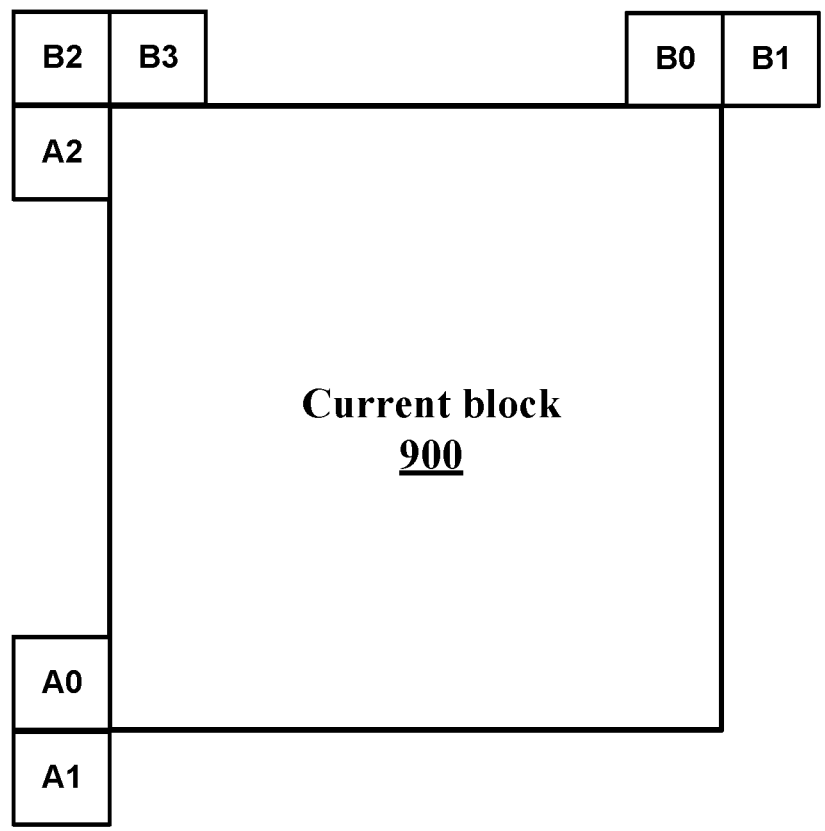
FIG. 9 is a conceptual diagram illustrating example neighboring block positions for obtaining motion information to construct affine history merge candidates.

FIG. 9 is a conceptual diagram illustrating example neighboring block positions for obtaining motion information to construct affine history merge candidates. A practical example of history-based affine merge candidate construction can be found in K. Zhang, L. Zhang, Z. Deng, N. Zhang and Y. Wang, "EE2-3.12-related: Extensions of history-parameter-based affine model inheritance", JVET-Y0161, January 2022. In this proposal, two different categories of affine history tables are proposed. In one type of affine history table, only the affine parameters from previously decoded CUs are buffered. Multiple tables are created with each of the table corresponding to a given reference index and reference list. With this design, for a specific affine history table, all the affine history entries share the same reference picture. When constructing affine merge candidates for a current block, like current block 900, using the history table, a spatial neighbor block position is first decided as depicted in FIG. 9.

The reference list and reference index from the spatial neighbor block current block 900 is used to decide the affine history table. The motion vector serves as the base motion vector and together with one of the entries in the affine history table, an affine merge candidate or the motion vector field for the current CU can be derived. For example, video encoder 200 or video decoder 300 may derive an affine merge candidate or motion vector field for the current CU.

In another type of affine history table, not only the affine parameters, but also the top-left CPMV and the top-left coordinate of the previously decoded CU are buffered. The reference index and reference list are also used and will be inherited by the current CU. The affine merge candidate construction can be performed with any of the entries in the affine history table solely without additional information. Video encoder 200 or video decoder 300 may use the buffered top-left CPMV, affine parameter, top-left coordinate, and the coordinate of the current CU to derive the affine model to the current CU. Meanwhile, since the top-left coordinate of the previously decoded CU is buffered, video encoder 200 or video decoder 300 may also access the motion vector field of the decoded CU directly.

Multivariate linear regression is now discussed. Multivariate linear regression, also known as multiple regression, is a statistical technique that can be used to analyze the relationship between a single dependent variable and several independent variables. The objective of multiple regression analysis is to use the independent variables whose values are known to predict the value of the single dependent value which is unknown. Each predictor value is weighed, with the weights denoting their relative contribution to the overall prediction and added up to form the prediction. A general model for multivariate linear regression is given by equation 1:

$$Y = a + b_1 X_1 + b_2 X_2 + \ldots + b_n X_n \quad (1)$$

Here Y is the dependent variable, and $X_1, \ldots, X_n$ are the n independent variables. In calculating the weights a, $b_1, \ldots, b_n$, the least square method may be applied where the mean square error between the statistical observation samples and the estimated value is minimized.

In VVC, a block-based affine transform motion compensation prediction is applied to better represent zoom in/out, rotation, perspective motions and the other irregular motions in which motion vector of each sub-block is derived based on a linear model. Motion vector at sample location (x, y) of a sub-block center is derived as:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad (2)$$

Here, taking $mv_x$ as an example, $mv_{0x}$, $mv_{1x}$ and $mv_{2x}$ are the horizontal motion vector components of the top-left, top-right and bottom-left control point motion vectors (CPMVs) correspondingly, which are known for a given affine model. W and H are the width and height of the current CU which are also known. In this case, the equation to derive $mv_x$, can be written in the formulae of linear regression. The same can be applied to $mv_y$. With this observation, the affine motion model can be equivalently represented by two linear equations in matrix form as:

$$\begin{pmatrix} mv_x \\ mv_y \end{pmatrix} = \begin{pmatrix} b_{x0} & b_{x1} & b_{x2} \\ b_{y0} & b_{y1} & b_{y2} \end{pmatrix} \begin{pmatrix} x \\ y \\ 1 \end{pmatrix} \quad (3)$$

Where $$b_{x0} = \frac{mv_{1x} - mv_{0x}}{W}, b_{x1} = \frac{mv_{2x} - mv_{0x}}{H} \text{ and } b_{x2} = mv_{0x};$$

$$b_{y0} = \frac{mv_{1y} - mv_{0y}}{W}, b_{y1} = \frac{mv_{2y} - mv_{0y}}{H} \text{ and } b_{y2} = mv_{0y}$$

respectively.

With the above equation, the derivation of an affine motion model may equate to the derivation of certain coefficients in a linear equation. The estimation of such linear coefficients can be solved by multivariate linear regression. For example, video encoder 200 or video decoder 300 may use multivariate linear regression for affine model derivation.

To apply multivariate linear regression to affine model derivation, video encoder 200 or video decoder 300 may gather motion vector information and its corresponding sub-block coordinate. The coordinates may be the independent variables, while the motion vector component may be the dependent variable. Given N motion vectors and their corresponding sub-block center coordinates, the affine model parameters can be derived using the following equations (See, e.g., R. Ghaznavi-Youvalarim, A. Aminlou and J. Lainema, "Regression-Based Motion Vector Field for Video Coding", IEEE Transactions on Circuits and Systems for Video Technology Volume: 31, Issue: 5, May 2021):

$$b_{c,d} = \frac{\det(B^{c,d})}{\det(A)}, \quad (4)$$

where $\det(B^{c,d})$ and $\det(A)$ are the determinant of matrix $B^{c,d}$ and matrix A, respectively $B^{c,d}$ and A are both 3×3 matrices. For a 3×3 matrix, the determinant can be computed by the following equation:

$$\det(M) = (M_{0,0} \times M_{1,1} \times M_{2,2} \times M_{1,0} \times M_{2,1} \times M_{0,2} \times M_{2,0} \times M_{0,1} \times M_{1,2}) - (M_{0,0} \times M_{2,1} \times M_{1,2} \times M_{1,0} \times M_{0,1} \times M_{2,2} \times M_{2,0} \times M_{1,1} \times M_{0,2}), \quad (5)$$

where $M_{i,j}$ is the element located at position (i,j) of the matrix and i, j∈{0, 1, 2}.

For the construction of matrices $B^{c,d}$ and A, the following equations are used:

$$\text{sum} MV1_{c,d} = \sum_{k=0}^{N-1} \left( MV_c^k \times I_d^k \right) \quad (6)$$

-continued $$\operatorname{sum} ll_{i,j} = \sum_{k=0}^{N-1}\left(l_i^k \times l_j^k\right) \quad (7)$$

$$A_{i,j} = \operatorname{sum} ll_{i,j} \quad (8)$$

$$B_{i,j}^{c,d} = \begin{cases} \operatorname{sum} MVl_{c,d}; & j = d \\ \operatorname{sum} ll_{i,j}; & \text{Otherwise} \end{cases} \quad (9)$$

where:
$$\begin{cases} c \in \{x, y\} \\ d, i, j \in \{0, 1, 2\} \\ k \in \{0, 1, \ldots, N-1\} \\ l_0: \text{ center location } x \text{ of } 4 \times 4 \text{ block} \\ l_1: \text{ center location } y \text{ of } 4 \times 4 \text{ block} \\ l_2 = 1 \end{cases}$$

With this method, an optimal affine model can be derived to best describe the input motion vectors considering its corresponding coordinates in a minimum mean square error sense.

To elaborate, an example is given here to illustrate how a linear model may be output from the input motion vector field. Assuming video encoder 200 or video decoder 300 have collected motion information from certain motion vector fields, the N motion vectors can be denoted by $\{(mv_{x0}, mv_{y0}), (mv_{x1}, mv_{y1}), \ldots, (mv_{xN-1}, mv_{yN-1})\}$, and the corresponding center coordinates are $\{(x_0, y_0), (x_1, y_1), \ldots, (x_{N-1}, y_{N-1})\}$.

In the first step, video encoder 200 or video decoder 300 decides (or determines) an anchor coordinate that serves as the origin of the output linear model instead of using (0, 0), which is the top-left coordinate of the whole picture to avoid large value(s) in computation. This step is also performed for the ease of deriving the affine merge candidate after the linear model parameters are derived from the linear regression process. Usually, video encoder 200 or video decoder 300 will pick the top-left coordinate of the current CU as the origin. Denoting it by $(x_{tl}, y_{tl})$, a relative coordinate is computed by subtracting $(x_{tl}, y_{tl})$ from each of the sub-block center coordinate. This results in $\{(x_0-x_{tl}, (y_0-y_{tl}), (x_1-x_{tl}, y_0-y_{tl}), \ldots, ((x_{N-1}-x_{tl}, y_{N-1}-y_{tl})\}$. Let $$x_i' = x_i - x_{tl}$$

$$y_i' = y_i - y_{tl}$$

where $i \in \{0, 1, \ldots, N-1\}$, then we have $\{(x_0', y_0'), (x_1', y_1'), \ldots, (x_{N-1}', y_{N-1}')\}$.

For motion vectors, video encoder 200 or video decoder 300 may also optionally pick an initial motion vector to be subtracted from in order to avoid a large value in computation as well, but this is not essential since motion vector values are relatively small compared to the coordinate value. Also motion vectors may have negative value and subtracting a negative value from a positive value only ends up with an even larger positive value.

The output linear model parameters may be estimated using mean square error (MSE) minimization method, for the N available neighboring MVs, where MSE is calculated as the average of the squared difference between the estimated MVs $\{(mv_{x0}', mv_{y0}'), (mv_{x1}', mv_{y1}'), \ldots, (mv_{xN-1}', mv_{yN-1}')\}$ and the actual values of the input MVs $\{(mv_{x0}, mv_{y0}), (mv_{x1}, mv_{y1}), \ldots, (mv_{xN-1}, mv_{yN-1})\}$, for horizontal and vertical components separately as shown in the following equation $$MSE_c = \Sigma_{k=0}^{N-1}(MV_c - MV_c') \quad (10)$$

Where $c \in \{x, y\}$ denotes the horizontal or vertical component of the motion vectors.

Mathematically, the solution to the MSE minimization is given by equation (4) above.

Taking the derivation of parameter $b_{x,0}$ as example, matrix A is derived by $A_{i,j} = \operatorname{sum} l'l'_{i,j}$ with i, j $\in \{0, 1, 2\}$, where $l'_0$ is the x' of each sub-block, $l'_1$ is the y' of each sub-block and $l'_2=1$ for all sub-blocks. Matrix A element at position (0, 0) denoted by $A_{0,0} = \operatorname{sum} ll_{0,0} = \Sigma_{k=0}^{N-1}(l'_0{}^k \times l'_0{}^k) = \Sigma_{k=0}^{N-1}(x_k' \times x_k')$. Similarly, the other elements in matrix A can be derived.

For matrix B, when deriving $b_{x,0}$, matrix $B^{x,0}$ is needed. From equation (9), All the matrix elements $B_{i,j}^{x,0}$ except for $B_{0,0}^{x,0}$, $B_{1,0}^{x,0}$ and $B_{2,0}^{x,0}$ since j=d=0 here, are equal to element $A_{i,j}$ from matrix A. For elements $B_{i,0}^{x,0}$, taking $B_{0,0}^{x,0}$ as an example, $B_{0,0}^{x,0} = \operatorname{sum} MVl'_{x,0} = \Sigma_{k=0}^{N-1}(MV_x^k \times l'_0{}^k) = \Sigma_{k=0}^{N-1}(MV_x^k \times x_k')$. Similarly, $B_{1,0}^{x,0}$ and $B_{2,0}^{x,0}$ can be derived.

With matrix A and $B^{x,0}$, coefficient $$b_{x,0} = \frac{\det(B^{x,0})}{\det(A)}$$

and the determinant of a 3×3 matrix can be computed using equation (5).

Applying a similar procedure to other coefficients, all the linear model parameters $$\begin{pmatrix} b_{x0} & b_{x1} & b_{x2} \\ b_{y0} & b_{y1} & b_{y2} \end{pmatrix}$$

can be solved.

With the estimated parameter, the affine merge candidate for the current CU can be derived using equation (2) with the top-left, top-right and bottom-left CPMVs denoted as $(mv_{tl}, mv_{tl})$, $(mv_{tr}, mv_{tr})$, $(mv_{bl}, mv_{bl})$ equal to $$(mv_{tl}, mv_{tl}) = (b_{x2}, b_{y2})$$

$$(mv_{tr}, mv_{tr}) = (b_{x0}W + b_{x2}, b_{y0}W + b_{y2})$$

$$(mv_{bl}, mv_{bl}) = (b_{x1}H + b_{x2}, b_{y1}H + b_{y2})$$

Where W and H are the width and height of the current CU. x and y in equation (2) is replaced by the relative distance from the top-left position of the current CU to the position of the corresponding CPMV.

Linear regression based affine merge candidates is now discussed. In ECM6.0, linear regression based affine merge candidate derivation as proposed in Y. Zhang, H. Huang, V. Seregin, M. Coban, and M. Karczewicz, "EE2-2.1: Regression based affine candidate derivation," Joint Video Experts Team (JVET) of ITU-T SG 16 WP 3 and ISO/IEC JTC 1/SC 29/WG 11, 27th Meeting: by Teleconference, 13-22 Jul. 2022, JVET-AA0107, was adopted. In the proposal, two types of linear regression based affine merge candidates are derived, the non-refined and refined candidates. For both types of candidates, the derivation process is the same with only different sub-block motion information being used as input.

Figure 10:
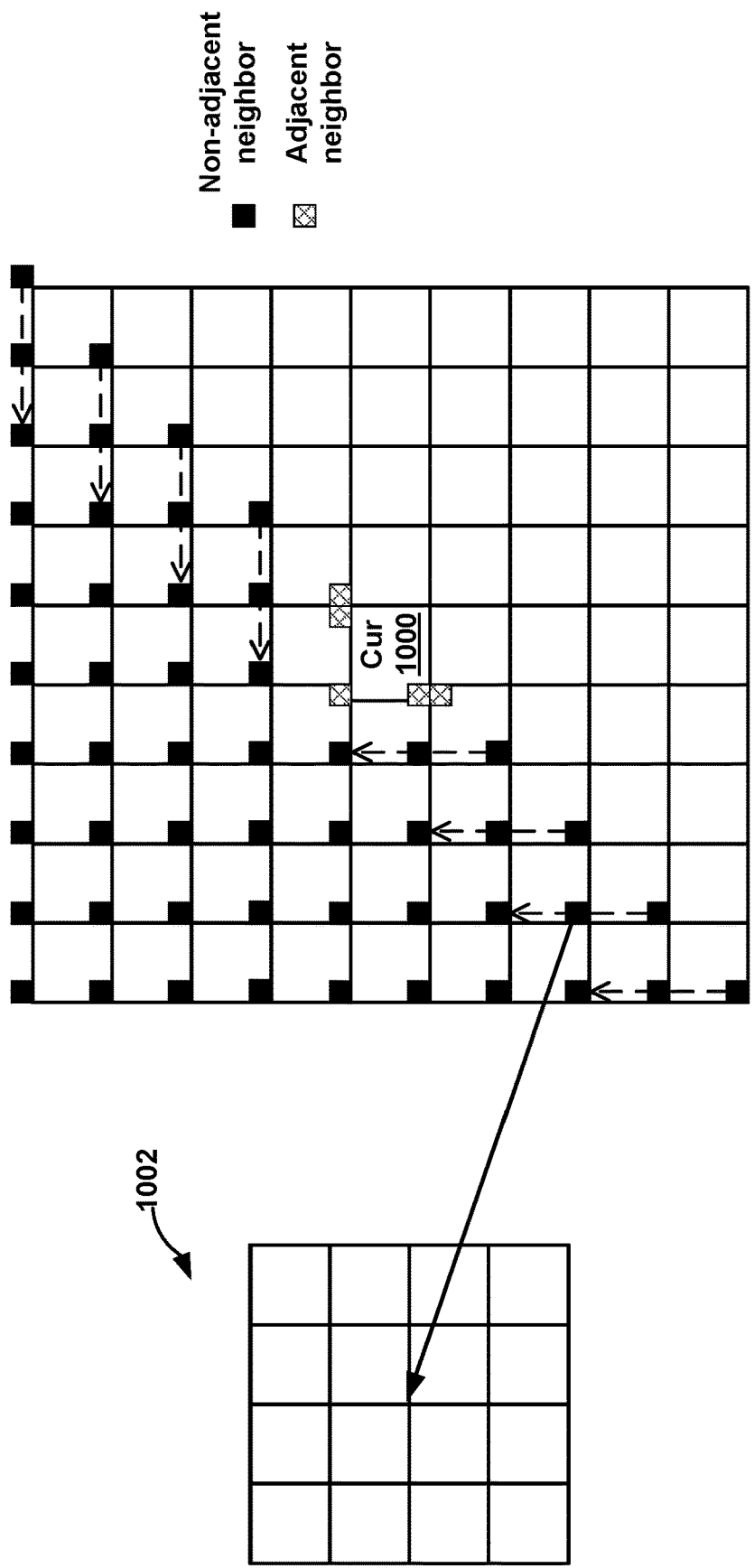
FIG. 10 is a conceptual diagram illustrating an example of searching for non-adjacent affine CU and using motion information to derive non-refined candidates.

FIG. 10 is a conceptual diagram illustrating an example of searching for non-adjacent affine CU and using motion information to derive non-refined candidates. For the non-refined candidates, only the sub-block motion information from a non-adjacent affine CU is used as the input to the linear regression process. FIG. 10 shows an example of input to the linear regression process to derive the non-refined linear regression-based affine merge candidates for current block 1000. As discussed above, certain scan patterns can be used in searching for non-adjacent affine CUs. Once a non-adjacent affine CU is identified, for example block 1002 as shown in FIG. 10, each of sub-block's motion information including sub-block's motion vectors denoted by $\{(mv_{x0}, mv_{y0}), (mv_{x1}, mv_{y1}), \ldots, (mv_{xN-1}, mv_{yN-1})\}$ and central coordinates denoted by $\{(x_0, y_0), (x_1, y_1), \ldots, (x_{N-1}, y_{N-1})\}$ are input to the linear regression process to derive non-refined affine merge candidates.

Figure 11:
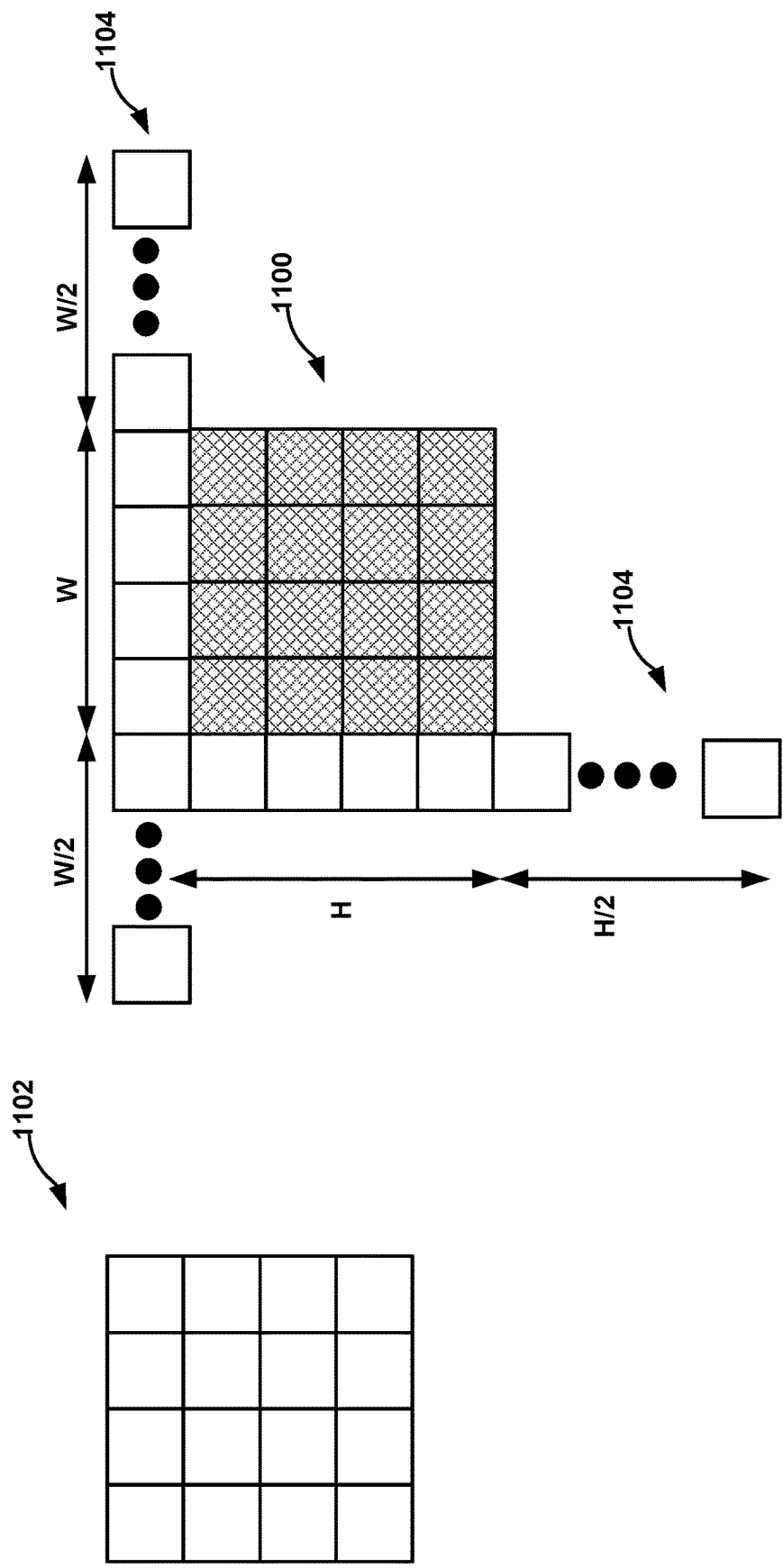
FIG. 11 is a conceptual diagram illustrating an example of subblock information used to derive refined candidates.

FIG. 11 is a conceptual diagram illustrating an example of subblock information used to derive refined candidates. For the refined candidates, on top of the motion information from sub-blocks 1100 with hashed filling in the non-adjacent affine CU (representative of non-adjacent block 1102), motion information from the template sub-blocks 1104 represented by the non-filled blocks in FIG. 11 may be additionally included as input to the linear regression process.

The linear regression process for deriving both the non-refined, as well as the refined candidates, are the same which follows the mathematical derivation as explained above. The only difference is information of which of the sub-blocks should be used as input to the linear regression process. For example, video encoder 200 or video decoder 300 may employ such a linear regression process for deriving both the non-refined, as well as the refined candidates.

Generally, when implementing an algorithm design in hardware, integer operation is preferable compared to floating point operation. Within the scope of integer operation design, only a limited (or reduced) bit length may be available. Usually for integer operation, the maximum bit length used is 64. Considering the maximum allowed value of coordinates x and y, motion vectors, number of input sub-blocks, when these variables exceed a certain bit length, intermediate result may exceed the maximum allowed bit length during the linear regression process. As described above, for the construction of matrices $B^{c,d}$ and A, the following equations may be used:

$$\text{sum } MVl_{c,d} = \sum_{k=0}^{N-1}\left(MV_c^k \times l_d^k\right) \quad (6)$$

$$\text{sum } ll_{i,j} = \sum_{k=0}^{N-1}\left(l_i^k \times l_j^k\right) \quad (7)$$

$$A_{i,j} = \text{sum } ll_{i,j} \quad (8)$$

$$B_{i,j}^{c,d} = \begin{cases} \text{sum } MVl_{c,d}; \ j = d \\ \text{sum } ll_{i,j}; \ \text{Otherwise} \end{cases} \quad (9)$$

where:
$$\begin{cases} c \in \{x, y\} \\ d, i, j \in \{0, 1, 2\} \\ k \in \{0, 1, \ldots, N-1\} \\ l_0: \text{center location } x \text{ of } 4 \times 4 \text{ block} \\ l_1: \text{center location } y \text{ of } 4 \times 4 \text{ block} \\ l_2 = 1 \end{cases}$$

In the current ECM design, the maximum allowed bit-length for motion vector components is 18 bits. In the linear regression process, the input motion vector is left shifted by 2 bits for the purpose of keeping higher precision during the computation. In addition, as delta motion vector values may be used, the delta computation will further increase the bit length since video encoder 200 or video decoder 300 may subtract a negative value from a positive one. Hence, the input motion vector delta components can be up to 21 bits.

For the delta x and y coordinates, the coordinates can approach two CTUs width or height. The maximum allowed CTU width or height is 256, two CTU width or height is 512 which requires 10 bits in binary representation. However, since the delta x and y can only approach, but will not reach two CTUs width or height, the maximum number of bits needed to represent delta x and y is 9 bits.

For the number of sub-blocks, the refined candidates require a greater number of sub-blocks than the unrefined candidates. In the extreme case, both the affine CU and the current CU is 256×256. The total number of sub-blocks N=(256/4*256/4)+(256+128*2)/4+(256+128)/4=4320 if the sub-block width and height is equal to 4. This number requires 13 bits in binary representation.

Let $l_0=x$, $l_1=y$ and $l_2=1$, matrix A can be derived by the following equation $$A = \begin{pmatrix} \sum x^2 & \sum xy & \sum x \\ \sum xy & \sum y^2 & \sum y \\ \sum x & \sum y & \sum 1 \end{pmatrix} = \begin{pmatrix} M_{0,0} & M_{0,1} & M_{0,2} \\ M_{1,0} & M_{1,1} & M_{1,2} \\ M_{2,0} & M_{2,1} & M_{2,2} \end{pmatrix}$$

For a 3×3 matrix, its determinant can be computed by the following equation:

$$\det(M) = (M_{0,0} \times M_{1,1} \times M_{2,2} \times M_{1,0} \times M_{2,1} \times M_{0,2} \times M_{2,0} \times M_{0,1} \times M_{1,2}) - (M_{0,0} \times M_{2,1} \times M_{1,2} \times M_{1,0} \times M_{0,1} \times M_{2,2} \times M_{2,0} \times M_{1,1} \times M_{0,2})$$

For each of the elements in matrix A, the maximum number of bits needed to hold the computation result is as following:

$$\begin{pmatrix} 31 & 31 & 22 \\ 31 & 31 & 22 \\ 22 & 22 & 13 \end{pmatrix} \text{ bits}$$

Taking $M_{0,0} = \Sigma x^2$ as an example, the maximum number of bits needed is 13+9+9=31 bits, here 13 is the maximum number of bits for number of input sub-blocks, and 9 is the maximum number of bits for delta coordinates x or y.

The cascade multiplication $M_{0,0} \times M_{1,1} \times M_{2,2}$ results in adding up the number of bits needed to represent each of the matrix element. The number of bits required for $M_{1,1}$ and $M_{2,2}$ are 31 and 13 bits respectively. Hence, the bit-length needed to hold this result is 31+31+13=75 bits, which has gone beyond the commonly used integer bit-length threshold that is 64 bits.

For matrix $B^{c,d}$, things can be worse, since the dynamic range of delta motion vector components are much larger than the delta coordinates. As mentioned before, the number of bits needed for delta motion vector components are 21 bits while the number of bits needed for delta coordinates are 9 bits. In one example, given the representation of matrix $B^{x,0}$:

$$B^{x,0} = \begin{pmatrix} \sum xmv_x & \sum xy & \sum x \\ \sum ymv_x & \sum y^2 & \sum y \\ \sum mv_x & \sum y & \sum 1 \end{pmatrix} = \begin{pmatrix} M_{0,0} & M_{0,1} & M_{0,2} \\ M_{1,0} & M_{1,1} & M_{1,2} \\ M_{2,0} & M_{2,1} & M_{2,2} \end{pmatrix}$$

Where the first column of matrix A is replaced by $\Sigma xmv_x$, $\Sigma ymv_x$, $\Sigma mv_x$. With this, the number of bits required for each element in matrix $B^{x,0}$ is:

$$\begin{pmatrix} 43 & 31 & 22 \\ 43 & 31 & 22 \\ 34 & 22 & 13 \end{pmatrix} \text{ bits}$$

The same bit length requirements applied to other matrices $B^{c,d}$, where $c \in \{x, y\}$ indicating horizontal and vertical delta motion vector components, $d \in \{0, 1, 2\}$ indicates which column in matrix A is to be replaced in deriving matrix $B^{c,d}$. It can be easily seen that the maximum number of bits needed to hold the determinant result of matrix $B^{c,d}$ can exceeds 64 bits.

After the determinant value is derived, according to Cramer's rule, the linear regression parameters can be computed by equation:

$$b_{c,d} = \frac{\det(B^{c,d})}{\det(A)}$$

Here $\det(B^{c,d})$ and $\det(A)$ represents the determinant of matrix $B^{c,d}$ and A. For a given motion vector component, for example horizontal components, one of the 3 linear regression parameters can be derived without computing the corresponding determinant of matrix $B^{x,d}$. For example, when d=2 and $b_{x0}$ and $b_{x1}$ have already been computed, according to the assumed linear model, $mv_x = xb_{x0} + yb_{x1} + b_{x2}$. Accumulating each of the input data sample, we have $\Sigma mv_x = b_{x0}\Sigma x + b_{x1}\Sigma y + b_{x2}\Sigma 1$. Denoting the total number of input sub-blocks as N, where $N=\Sigma 1$, we have $$b_{x2} = \frac{\sum mv_x - b_{x0}\sum x - b_{x1}\sum y}{N}.$$

With this, the following equation also holds:

$$b_{x2} = \frac{\sum mv_x - b_{x0}\sum x - b_{x1}\sum y}{N}$$
$$= \frac{\sum mv_x - (\det(B^{x,0})/\det(A))\sum x - (\det(B^{x,1})/\det(A))\sum y}{N}$$
$$= \frac{\det(A)\sum mv_x - \det(B^{x,0})\sum x - \det(B^{x,1})\sum y}{N \det(A)}$$

From the above equation, video encoder 200 or video decoder 300 may compute 3 determinants, which are det(A), $\det(B^{x,0})$ and $\det(B^{x,1})$. $\Sigma xmv_x$ is a matrix element of matrix $B^{x,0}$ or $B^{z,1}$. $\Sigma x$ and $\Sigma y$ are matrix element from matrix A. However, the nominator of the above equation has further multiplications and additions on top of the 3×3 matrices determinants which will further increase the maximum number of bits required to store the intermediate result.

Furthermore, division operation is generally not preferred in a hardware implementation and is usually approximated by multiplication and right bit-shift. Usually, a look up table for multiplication and a fixed number of right bit shifts is used. To reuse the same logic for computing all the linear regression parameters, the same denominator should be used for all parameters. As such, the derivation of parameter $b_{x0}$ and $b_{x1}$ are modified to be:

$$b_{x0} = \frac{N\det(B^{x,0})}{N\det(A)}$$
$$b_{x1} = \frac{N\det(B^{x,1})}{N\det(A)}$$

Hence, each of the determinant will need to multiply the number of input sub-blocks, which again increase the bit length. Also, as mentioned above, the division is approximated by multiplication and right bit-shift. The multiplication before the right bit shift will also end up with a higher bit length requirement to hold the intermediate result.

Based on the above observations, to ensure a feasible hardware implementation, bit length control may be beneficial in a linear regression process. As such, this disclosure describes bit length control solutions for linear regression-based affine merge candidate derivation. Bit length control is applied to input variables and intermediate results to meet the commonly defined bit-length threshold in hardware implementation. For example, video encoder 200 or video decoder 300 may control a bit length of input variables for a linear regression. Video encoder 200 or video decoder 300 may perform the linear regression on controlled bit length input variables. Video encoder 200 or video decoder 300 may derive an affine motion model based on the performing the linear regression operation. Video encoder 200 or video decoder 300 may code a current block of the video data based on the affine motion model. In some examples, video encoder 200 or video decoder 300 may determine affine motion information based on the affine motion model. In some examples, the affine motion information includes an affine motion candidate. For example, the output of the linear regression may be an affine motion model from which an affine motion candidate may be derived or determined. In some examples, the output of the linear regression may include the affine motion candidate.

Bit length control over input delta coordinates is now discussed. As described above, the anchor coordinates currently being used are those of the top-left position of the current CU. Hence, the delta coordinates can be used to approximate the distance between the sub-block and the current CU. The non-adjacent affine CU or the template sub-block may not be too far-away from the current CU because the further away the sub-block locates, the less correlated it is likely to be. Therefore, video encoder 200 or video decoder 300 may place an upper bound threshold for delta x and y so that the sub-block will be relatively close. Meanwhile, with this constraint, the bit length of delta x and y can also be reduced. In one example, the threshold for delta coordinates is set to be N bits (excluding the sign bit), and only sub-blocks that have both delta x and delta y values within the range of [−(1«N), (1«N)−1] will be used as input to the linear regression process. If a sub-block has delta coordinates outside of the range, this sub-block will be skipped. In one example, N=8. In this way, video encoder 200 or video decoder 300 may ensure that each sub-block being used in the linear regression process is within one CTU distance from the anchor position.

Bit length control over input delta motion vectors is now discussed. When searching for motion vectors, for example by motion estimation, a search range is defined. Only the reference picture area within the search range is examined. Because of this, generally a motion vector with too large value should not occur. However, some other techniques may use motion vectors with scaling. For example, for TMVP, the motion vector is scaled based on POC distance.

After being selected as TMVP for multiple times, a cascade of scaling may occur which may cause the TMVP to end up with a very large value. Overall, such motion vectors are generally rare and less accurate. Based on this, video encoder 200 or video decoder 300 may also employ a threshold to regulate the delta motion vector component value. Defining the bit length threshold for delta motion vector component to be N bits (excluding the sign bit), in one example, if the motion vector component value is outside the range of [−(1≪N), (1≪N)−1], this sub-block will not be used. In a second example, instead of skipping the sub-block, the motion vector may be clipped to the range of [−(1≪N), (1≪N)−1] and still be used. In yet a third example, the motion vector may be wrapped by modulo operation. For example, defining the horizontal delta motion vector component to be deltaMVx, if deltaMVx is larger than (1≪N)−1 or smaller than −(1≪N), deltaMVx % (1≪N) is used instead. In one application example, video encoder 200 or video decoder 300 may set N=12, with this, the motion vector dynamic range will be [−(1≪12), (1≪12)−1]. In ECM, the current motion vector precision is 1/16-pel. Hence, the motion vector dynamic range in terms of number of samples is [−(1≪N), (1≪N)−1], which is one CTU.

Bit length control over number of input sub-blocks is now discussed. For the number of input sub-blocks, for those sub-blocks from the non-adjacent affine CU, since they already belong to the same linear model, video encoder 200 or video decoder 300 may only need 3 sub-blocks to derive the linear model. For the template sub-blocks of current CU, they are usually similar to each other within a given area and hence video encoder 200 or video decoder 300 may not need all of them. Based on the analysis, setting the bit length for the number of sub-blocks to be N bits, a total number of M=(1≪N)−1 sub-blocks can be used. In one example, [M/2] sub-blocks will be used from the template area and [M/2] sub-blocks will be used from the non-adjacent affine CU. A different distribution of number of sub-blocks to be used from non-adjacent affine CU and template area may be adopted to emphasize either the importance of non-adjacent affine CUs or template region. In a second example, more sub-blocks are used from non-adjacent affine CU than from the template. For example, only [M/4] sub-blocks from template area may be used while M−[M/4] sub-blocks from the non-adjacent affine CU may be used. In a third example, the number of sub-blocks used from template area is first decided. Defining the maximum number of allowed sub-blocks for template area to be T and the number of available sub-blocks from template area is T', S=min(T, T') sub-blocks from the template area may be used. Subsequently, the number of sub-blocks that may be used from the non-adjacent affine CU is set to be M−S. In one example, video encoder 200 or video decoder 300 may set N=8, which means there can be up to 255 sub-blocks. Correspondingly, if [M/2] sub-blocks will be used from the template area and [M/2] sub-blocks will be used from the non-adjacent affine CU, then video encoder 200 or video decoder 300 may use up to 127 sub-blocks from template area and 128 sub-blocks from the non-adjacent affine CU.

Selections of input sub-blocks is now discussed. As explained above, when the total number of available sub-blocks exceeds the pre-defined upper limit, some of the sub-blocks may be excluded from the input. Different techniques can be used to perform the selection. In one example, video encoder 200 or video decoder 300 may collect sub-blocks with the given scan order until the number of sub-blocks reaches the threshold. In a second example, video encoder 200 or video decoder 300 may use a sub-sampling to select sub-blocks with a given sub-sample ratio. In yet a third example, a combination of the first two examples can be used. For example, the template sub-blocks are sub-sampled while the non-adjacent affine CU's sub-block are selected using the technique described in the first example.

Bit length control over linear regression output parameters is now discussed. This section describes an analysis of the range of the output linear regression parameters. According to the techniques of this disclosure, a bit length of linear regression operation output parameters may be controlled. Given the dynamic range of the input delta motion vector to be M bits, also knowing that the minimum delta coordinate between a sub-block's center coordinate to the anchor coordinate (anchor coordinate is defined to be the top-left coordinate of current CU) is 2 pixels, taking affine parameter a as an example, based on its derivation equation $$a = \frac{mv_{1x} - mv_{0x}}{W},$$

the maximum bit length of linear regression parameter is (M−1) bits. Because of this, the output linear regression parameters should be clipped within the range of [−(1≪(M−1)), (1≪(M−1))−1]. In affine model mv x=ax+by+c, parameter a and b represents the zooming and rotation part while c represents the translational part. From the model equation, translational parameter c is not divided by the CU width or height. Therefore, defining the maximum CU size to be N bits, the dynamic range for parameter c is [−(1≪(M+N)), (1≪(M+N))−1]. The dynamic range of parameter a and b is different from parameter c. Based on these findings, in one example, all the output linear regression parameters are clipped to the range of [−(1≪(M+N)), (1≪(M+N))−1]. In a second example, the linear regression parameters are clipped to different range with parameter a and b clipped to [−(1≪(M−1)), (1≪(M−1))−1] and parameter c clipped to [−(1≪(M+N)), (1 ≪(M+N))−1]. By clipping, video encoder 200 or video decoder 300 may not only regulate the linear regression parameters to reasonable values, but also prevent bit length overflow in the later part when the parameters are used to derive affine motion vectors. In one example, all the linear regression parameters are clipped to the same dynamic range. With M=12 and N=8, the linear regression parameters are clipped to [−(1≪20), (1≪20)−1].

Application bit length control on ECM affine RMVF (regression-based motion vector field) derivation is now discussed. Above, based on the ECM implementation of affine RMVF derivation process, this disclosure discusses in detail those aspects that may lead to bit length overflow. Also above, different techniques are introduced to regulate the input and output variables from linear regression. This section of this disclosure describes an example of how to address the previously mentioned bit length issue by using examples described herein jointly following the affine RMVF derivation flow used in ECM. For example, video encoder 200 or video decoder 300 may employ the bit length control techniques described herein.

As described above, the bit depths of each matrix elements for matrices A and $B^{c,d}$ are as following respectively:

$$\begin{pmatrix} 31 & 31 & 22 \\ 31 & 31 & 22 \\ 22 & 22 & 13 \end{pmatrix} \text{bits}$$

$$\begin{pmatrix} 43 & 31 & 22 \\ 43 & 31 & 22 \\ 34 & 22 & 13 \end{pmatrix} \text{ bits}$$

Based on the determinant equation $$\det(M) = (M_{0,0} \times M_{1,1} \times M_{2,2} \times M_{1,0} \times M_{2,1} \times M_{0,2} \times M_{2,0} \times M_{0,1} \times M_{1,2}) - (M_{0,0} \times M_{2,1} \times M_{1,2} \times M_{1,0} \times M_{0,1} \times M_{2,2} \times M_{2,0} \times M_{1,1} \times M_{0,2})$$

The bit length of matrix A is the addition of a series of numbers with (31+31+13) bits, (31+22+22) bits, (22+31+22) bits, (31+22+22) bits, (31+31+13) bits and (22+31+22) bits, which is equivalent to adding up 6 numbers with 75 bits. Adding 6 numbers with the same number of bit length will further increase the result number bit length by 3 bits. Hence, the maximum number of bits required for determinant of matrix A is 78 bits.

Similarly, for matrix $B^{c,d}$, the determinant is the addition of a series of numbers with (43+31+13) bits, (43+22+22) bits, (34+31+22) bits, (43+22+22) bits, (43+31+13) bits and (34+31+13) bits. This will end up with a bit length requirement of 90 bits.

To make sure the maximum number of bits does not exceed the 64-bit bit length limit, video encoder 200 or video decoder 300 may place a certain upper bound threshold on each of the input variables, including delta x and y coordinates, delta horizontal and vertical motion vector components, and number of input sub-blocks as described above. For example, video encoder 200 or video decoder 300 may place a certain upper bound threshold on each of the input variables, including delta x and y coordinates, delta horizontal and vertical motion vector components, and number of input sub-blocks so as to reduce or limit a number of bits.

In one example, video encoder 200 or video decoder 300 may reduce or limit the bit-length of delta x and y coordinates to be 8 bits. If a sub-block is in a position such that a delta x or y component is larger than 8 bits, video encoder 200 or video decoder 300 may skip this sub-block as an input to the linear regression. The bit length limit of delta horizontal and vertical motion vector component may be set to be 12 bits, if a delta motion vector component exceeds the threshold, it will be clipped to the allowed range. For the number of sub-blocks, the bit length threshold may be set to 8 bits. With 8 bits for number of sub-blocks, there can be at most 255 sub-blocks. The number of sub-blocks used from the template area may first be decided. In some examples, the number of sub-blocks used from the template area may be restricted to be below 127. Based on the pattern of the template region, the total number of sub-blocks from template area can be computed by the equation (2*W+1.5*H)/4. When the current CU size is 128×128, the number of sub-blocks from template area is 112, which is still below 127. However, currently in ECM, the maximal CU size allowed is 256. Hence, in case the CU width or height is 256, video encoder 200 or video decoder 300 may perform sub-sampling correspondingly in the horizontal template row scan or vertical template column scan with sub-sampling ratio of ½. In this way, video encoder 200 or video decoder 300 may can ensure the number of sub-blocks used from the template areas does not exceed the limit (e.g., 127). When the number of available sub-block from the template area is below the predefined limit, all the sub-blocks may be used. Defining the number of actual sub-blocks found in the template area as T, then the maximal number of sub-blocks allowed from non-adjacent affine CU is 255−T. If the number of available non-adjacent affine sub-blocks is larger than the threshold, the first available 255−T sub-blocks in raster scan order may be used. With these thresholds defined, the maximum number of bits needed for the determinant value of matrix A and $B^{c,d}$ are 59 bits and 63 bits which meets the bit depth limit.

The linear regression parameters are computed by the division between the determinants of two matrices with the exception to $b_{x2}$. In the current implementation, $b_{x2}$ is computed with the following formula:

$$b_{x2} = \frac{\det(A) \sum mv_x - \det(B^{x,0}) \sum x - \det(B^{x,1}) \sum y}{N \det(A)}$$

However, with this method, the determinant values are further multiplied by different factors in both numerator and denominators which may result in a bit length exceeding 64 bits.

As one example, to keep bit length from exceeding 64 bits, video encoder 200 or video decoder 300 may use Cramer's rule, which is already being used for deriving $b_{x0}$ and $b_{x1}$:

$$b_{c,d} = \frac{\det(B^{c,d})}{\det(A)}$$

For matrix $B^{x,2}$, the bit depth for each of the element is as following:

$$B^{x,2} = \begin{pmatrix} \sum x^2 & \sum xy & \sum xmv_x \\ \sum xy & \sum y^2 & \sum ymv_x \\ \sum x & \sum y & \sum mv_x \end{pmatrix} = \begin{pmatrix} 24 & 24 & 28 \\ 24 & 24 & 28 \\ 16 & 16 & 20 \end{pmatrix} \text{ bits}$$

From the determinant computation equation, the maximum bit depth of determinant $B^{x,2}$ is 71 bits. Even though one may replace the previous $b_{x2}$ derivation equation with Cramer's rule, its determinant can still exceed the bit depth limit. One solution is to scale both the numerator and denominator depending on the number of input sub-blocks. Defining the number of input sub-blocks to be iNum, the bit length of a variable x as MSB(x), the scaling shift of both numerator and denominator to be scaleshift, then $$scaleshift = \begin{cases} 0, & MSB(iNum) - 5 \le 0 \\ 3 * (MSB(iNum) - 5), & \text{otherwise} \end{cases}$$

Subsequently, $$b_{c,d} = \frac{\det(B^{x,2}) \gg scaleshift}{\det(A) \gg scaleshift}$$

For the denominator, if the MSB(det(A)) is not larger than scaleshift, after the right shift, it will result in 0. To avoid dividing by 0, if MSB(det(A))≤scaleshift, video encoder 200 or video decoder 300 may set the denominator to 1.

As mentioned before, the final division is approximated by multiplication and right bit shift. The multiplier is taken from a predefined lookup table and the index used to reference the lookup table is decided by the denominator, or equivalently the determinant of matrix A. In the current design, the lookup table size is defined to be 64. Subsequently, the 6 most significant bits of det(A) are derived and used as the reference index. Defining the bit length of a variable x as MSB(x). The index used for the lookup table is computed by:

$$\text{index} = \begin{cases} \det(A), & MSB(\det(A)) - 6 \le 0 \\ \det(A) \gg (MSB(\det(A)) - 6), & \text{otherwise} \end{cases}$$

With the index derived, the multiplier is defined by referencing the lookup table and can be denoted by lookup [index]. Corresponding to the currently used lookup table's bit length, a fixed 15 bits right shift is needed. The division result is computed using the following equation:

$$b_{c,d} = (\det(B_{c,d}) * \text{lookup}[\text{index}]) \gg (15 + \text{shiftA})$$

where shiftA=(MSB(det(A))−6)<0?0:(MSB(det(A))−6), shiftA need to be added because the denominator has performed a right bit shift with shiftA bits, correspondingly, the numerator should perform the same shift.

Usually, during the affine parameter derivation process, the affine parameters are kept in high precision by performing a left bit shift of MaxCuDepth where 2^MaxCuDepth is the maximum allowed CTU size. In linear regression, the same manner of keeping affine parameters in high precision may be used. When this bit shift is additionally performed, video encoder 200 or video decoder 300 may take this into consideration in the bit length control. Therefore, the equation to derive $b_{c,d}$ becomes $$b_{c,d} = (\det(B_{c,d}) * \text{lookup}[\text{index}]) \gg (15 + \text{shiftA})) \ll \text{MaxCuDepth}$$

Currently in ECM, MaxCuDepth is defined to be 8. Since MaxCuDepth<15, we have $$b_{c,d} = (\det(B_{c,d}) * \text{lookup}[\text{index}]) \gg (15 + \text{shiftA})) \ll \text{MaxCuDepth}$$

The maximum bit-length for lookup[index] is 15 bits, to make sure intermediate result (det($B_{c,d}$)*lookup[index] stay within 64-bit's range, det($B_{c,d}$) has to be no more than 48 bits. Hence, an additional bit shift to both sides of operator "»" in the equation may be added. The additional right bit shift defined as rightshiftNum is $$\text{rightshiftNum} = \begin{cases} 0, & MSB(\det(B_{c,d})) - 48 \le 0 \\ MSB(\det(B_{c,d})) - 48, & \text{otherwise} \end{cases}$$

The final equation to derive $b_{c,d}$ is $b_{c,d}$=((det($B_{c,d}$)»rightshiftNum)*lookup[index])»(15+shiftA−MaxCuDepth−rightshiftNum)

To avoid bit shift of negative number, 15+shiftA−MaxCuDepth−rightshiftNum may be clipped. Defining the final right shift variable to be finalshift, then $$\text{rightshiftNum} = \begin{cases} 0, & 15 + \text{shiftA} - \text{MaxCuDepth} - \text{rightshiftNum} \le 0 \\ 15 + \text{shiftA} - \text{MaxCuDepth} - \text{rightshiftNum}, & \text{otherwise} \end{cases}$$

In a different method, video encoder 200 or video decoder 300 may save the operation to compute MSB(det($B_{c,d}$)) by always shift det($B_{c,d}$) to the right by 15 bits. In this way, video encoder 200 or video decoder 300 may also ensure numerator stay within 64-bit range. Setting rightshift-Num=15, $$b_{c,d} = (\det(B_{c,d}) * \text{lookup}[\text{index}]) \gg (15 + \text{shiftA})) \ll \text{MaxCuDepth}$$

Similarly, shiftA−MaxCuDepth may also be clipped to non-negative values.

Finally, the output linear regression parameters may be clipped within the range of [−(1«M), (1«M)−1] where M is set to 20 in the current solution.

Figure 12:
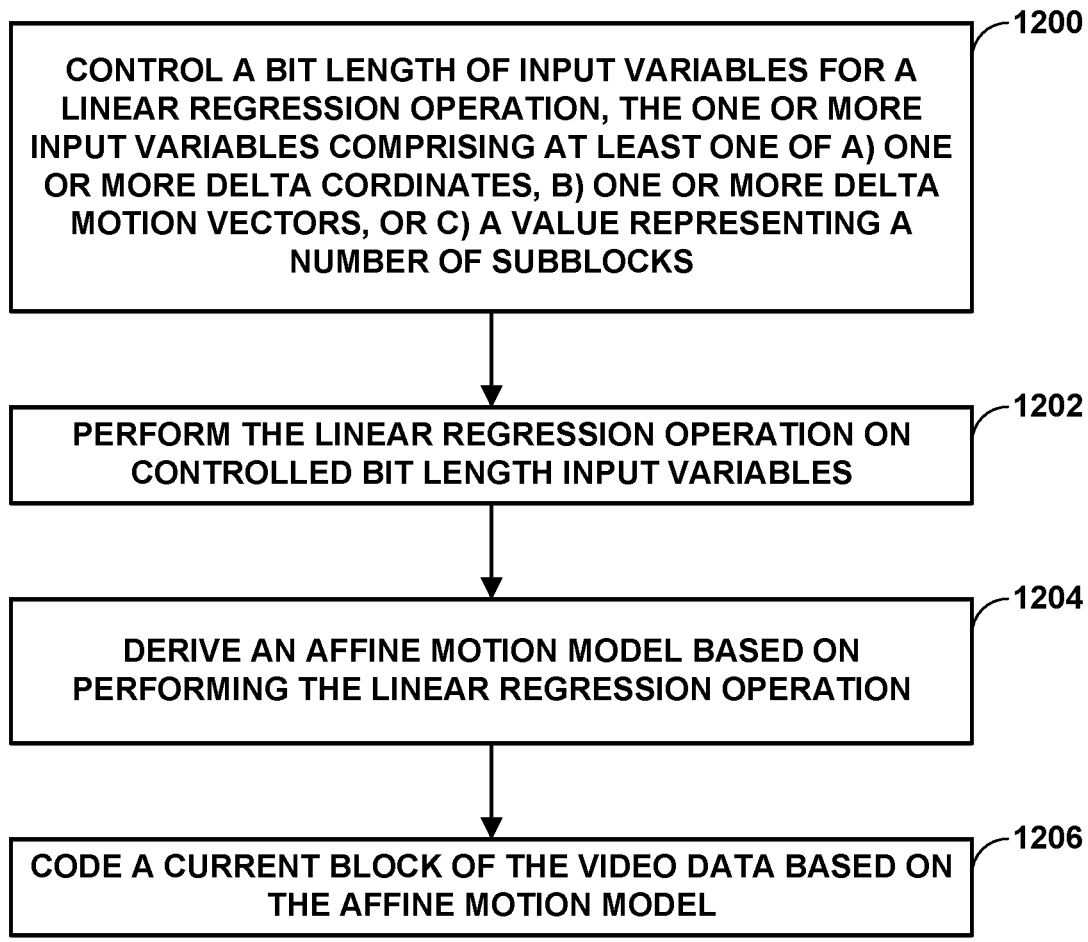
FIG. 12 is a flowchart illustrating example bit-length control techniques for linear regression-based affine merge candidate derivation according to one or more aspects of this disclosure.

FIG. 12 is a flowchart illustrating example bit-length control techniques for linear regression-based affine merge candidate derivation according to one or more aspects of this disclosure. Video encoder 200 or video decoder 300 may control a bit length of input variables for a linear regression operation, the input variables comprising at least one of a) one or more delta coordinates, b) one or more delta motion vectors, or c) a value representing a number of subblocks (1200). For example, video encoder 200 or video decoder 300 may control (e.g., reduce or limit) a bit length of one or more delta coordinates, one or more delta motion vectors, and/or a value representing a number of subblocks to generate one or more reduced bit length input variables. For example, video encoder 200 or video decoder 300 may clip the value of lengthy input variable, or skip the use of input variables associated with certain subblocks if the bit length of potential input variables is lengthy (e.g., greater than a threshold).

Video encoder 200 or video decoder 300 may perform the linear regression operation on controlled bit length input variables (1202). For example, video encoder 200 or video decoder 300 may use input variables whose bit lengths have been controlled as input to the linear regression operation.

Video encoder 200 or video decoder 300 may derive an affine motion model based on performing the linear regression operation (1204). For example, video encoder 200 or video decoder 300 may generate an affine motion candidate (e.g., an affine motion vector predictor candidate) based on performing the linear regression operation.

Video encoder 200 or video decoder 300 may code a current block of the video data based on the affine motion model (1206). For example, video encoder 200 may encode the video data based on the affine motion model or video decoder 300 may decode the video data based on the affine motion model.

In some examples, the input variables include the one or more delta coordinates. In some examples, as part of controlling the bit length of the input variables, video encoder 200 or video decoder may determine that at least one of a bit length of a value of a delta x or a value of a delta y of one or more delta coordinates is greater than a delta x delta y bit length threshold, wherein the value of the delta x includes a value indicative of a distance in an x direction between a current subblock of a current block and an x anchor coordinate of the current block and wherein the value of the delta y includes a value indicative of a distance in a y direction between the current subblock and a y anchor coordinate of the current block. Based on at least one of the bit lengths of the value of delta x or the value of delta y being greater than the delta x delta y bit length threshold, video encoder 200 or video decoder 300 may skip the current subblock as an input to the linear regression operation. In some examples, the delta x delta y bit length threshold is 8 bits.

In some examples, the input variables include the one or more delta motion vectors. In some examples, as part of as part of controlling the bit length of the input variables, video encoder 200 or video decoder 300 may determine that a bit length of a delta motion vector component is greater than a delta motion vector bit length threshold; and based on the bit length of the delta motion vector component being greater than the delta motion vector bit length threshold, skip a current subblock as input to the linear regression operation. In some examples, as part of controlling the bit length of the input variables, video encoder 200 or video decoder 300 may determine that a bit length of a delta motion vector component is greater than a delta motion vector bit length threshold and based on the bit length of the delta motion vector component being greater than the delta motion vector bit length threshold, clip to the delta motion vector component to the length of the delta motion vector bit length threshold. In some examples, the delta motion vector bit length threshold is 12 bits.

In some examples, as part of controlling the bit length of the input variables, video encoder 200 or video decoder 300 may determine whether a bit length of a delta motion vector component is greater than a first delta motion vector bit length threshold or smaller than a second delta motion vector bit length threshold. Based on a determination that the bit length of the delta motion vector component is greater than the first delta motion vector bit length threshold or smaller than the second delta motion vector bit length threshold, video encoder 200 or video decoder 300 may use a substitute delta motion vector component in place of the delta motion vector component as input to the linear regression operation, the substitute delta motion vector component having a bit length less than the delta motion vector component.

In some examples, as part of controlling the bit length of the input variables, video encoder 200 or video decoder 300 may reduce a bit length of a value representing a number of subblocks used in the linear regression operation to a predetermined bit length. In some examples, the predetermined bit length is 8 bits.

In some examples, as part of controlling the bit length of the input variables, video encoder 200 or video decoder 300 may select a subset of subblocks of a current block of the video data for use as input to the one or more input variables for the linear regression operation, the subset of subblocks being less than a total number of subblocks within the current block. In some examples, video encoder 200 or video decoder 300 may determine a first number of subblocks within a template area and determine a second number of subblocks within a non-adjacent affine block, wherein the non-adjacent affine block is a block of the video data that is not adjacent to the current block and is coded using an affine mode. In some examples, the first number includes M/2 and the second number includes M/2, where M represents the number of subblocks used in the linear regression operation. In some examples, the first number includes M/4 and the second number includes M−M/4, where M represents the number of subblocks used in the linear regression operation.

In some examples, video encoder 200 or video decoder 300 may determine T, a maximum number of allowed sub-blocks for the template area and determine T', a number of available sub-blocks from template area, wherein the first number, S, includes S=min(T, T') and the second number includes M−S, where M represents the number of subblocks used in the linear regression operation.

In some examples, as part of selecting the subset of subblocks, video encoder 200 or video decoder 300 may select sub-blocks in scan order. In some examples, as part of selecting the subset of subblocks, video encoder 200 or video decoder 300 may sub-sample using a predetermined sub-sample ratio. In some examples, as part of selecting the subset of subblocks, video encoder 200 or video decoder 300 may sub-sample subblocks in the template area using a predetermined sub-sample ratio and select non-adjacent affine sub-blocks in scan order until a number of selected sub-blocks equals the second number.

In some examples, as part of selecting the subset of subblocks, video encoder 200 or video decoder 300 may determine whether at least one of a height or a width of a current CU of the current block is equal to 256. In such examples, video encoder 200 or video decoder 300 may, based on a determination that at least one of the height or the width of the current CU is equal to 256, perform sub-sampling in at least one of a horizontal template row scan of the template area or a vertical template column scan of the template area with a sub-sampling ratio of ½. Video encoder 200 or video decoder 300 may determine a total number, T, of subblocks of the template area and determine whether a total number of available non-adjacent affine subblocks is greater than 255−T. Video encoder 200 or video decoder 300 may, based on a determination that the total number of available non-adjacent affine subblocks is greater than 255−T, use the first 255−T available non-adjacent affine sub-blocks in raster scan order as input for the linear regression operation.

In some examples, video encoder 200 or video decoder 300 may limit a bit length of one or more linear regression operation output parameters. In some examples, as part of liming a bit length of one or more linear regression operation output parameters, video encoder 200 or video decoder 300 may clip the one or more linear regression operation output parameters. In some examples, as part of clipping the one or more linear regression operation output parameters, video encoder 200 or video decoder 300 may clip each of the one or more linear regression operation output parameters to a same number of bits. In some examples, as part of clipping the one or more linear regression operation output parameters, video encoder 200 or video decoder 300 may clip at least one parameter of the one or more linear regression operation output parameters to a different number of bits than other parameters of the one or more linear regression operation output parameters. In such examples, as part of clipping the at least one parameter of the one or more linear regression operation output parameters to the different number of bits than other parameters of the one or more linear regression operation output parameters, video encoder 200 or video decoder 300 may clip a first linear regression operation output parameter to a range of [−(1«(M+N)), (1«(M+N))−1] and clip a second linear regression operation output parameter and a third linear regression operation output parameter to a range of [−(1 «(M−1)), (1«(M−1))−1, where M=12 and N=8.

In some examples, video encoder 200 or video decoder 300 may determine an affine motion candidate based on the affine motion model.

Figure 13:
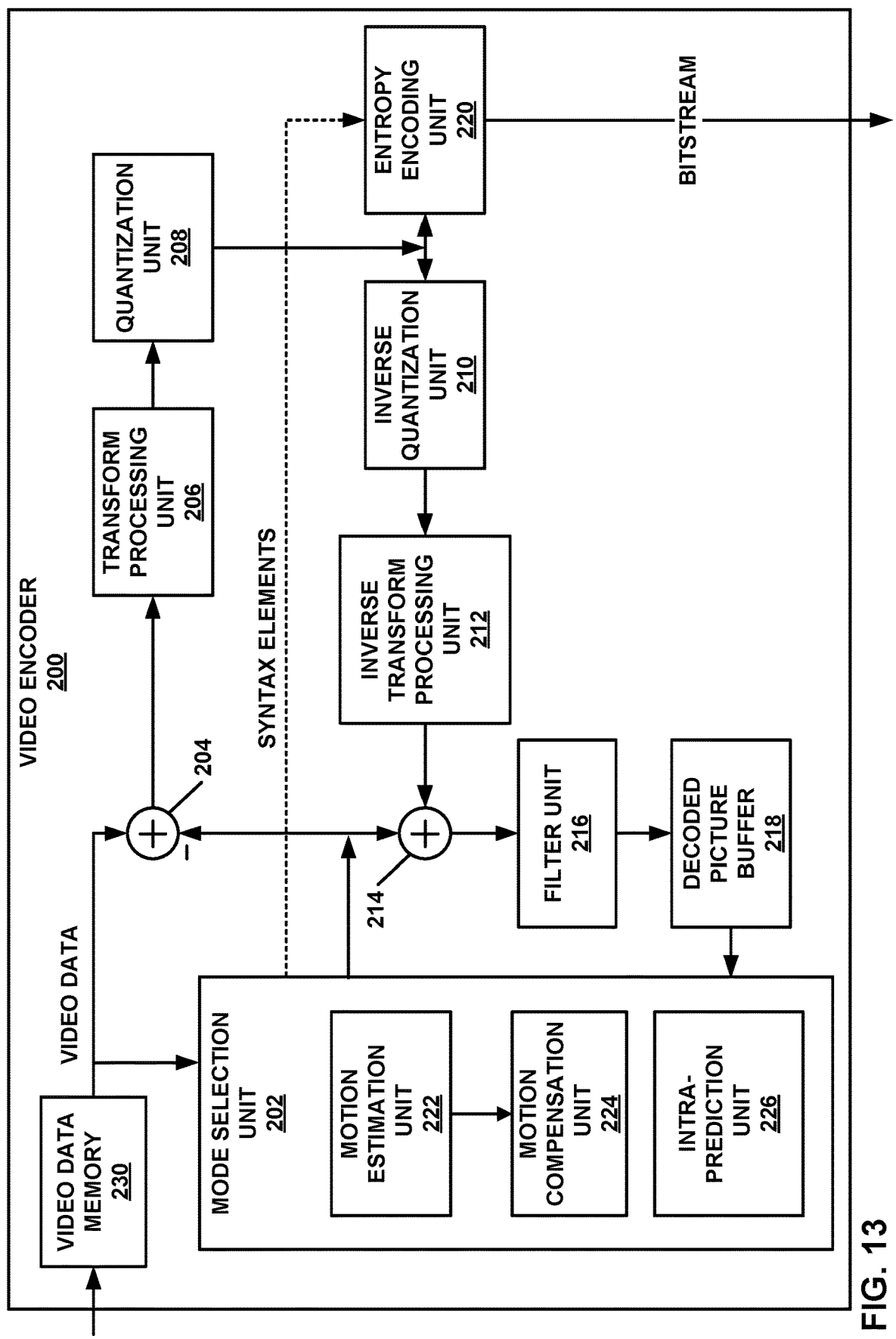
FIG. 13 is a block diagram illustrating an example video encoder that may perform the techniques of this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. In some examples, in forming the motion vectors, motion estimation unit 222 may perform the techniques of FIG. 12. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2 N×2 N, video encoder 200 may support PU sizes of 2 N×2 N or N×N for intra prediction, and symmetric PU sizes of 2 N×2 N, 2 N×N, N×2 N, N×N, or similar for inter prediction. Video encoder 200 and video decoder 300 may also support asymmetric partitioning for PU sizes of 2 N×nU, 2 N×nD, nL×2 N, and nR×2 N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2 N×2 N, 2 N×N, or N×2 N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to control (e.g., reduce or limit) a bit length of input variables for a linear regression operation; perform the linear regression operation on controlled bit length input variables; derive an affine motion model based on the performing the linear regression operation; and encode a current block of the video data based on the affine motion model.

Figure 14:
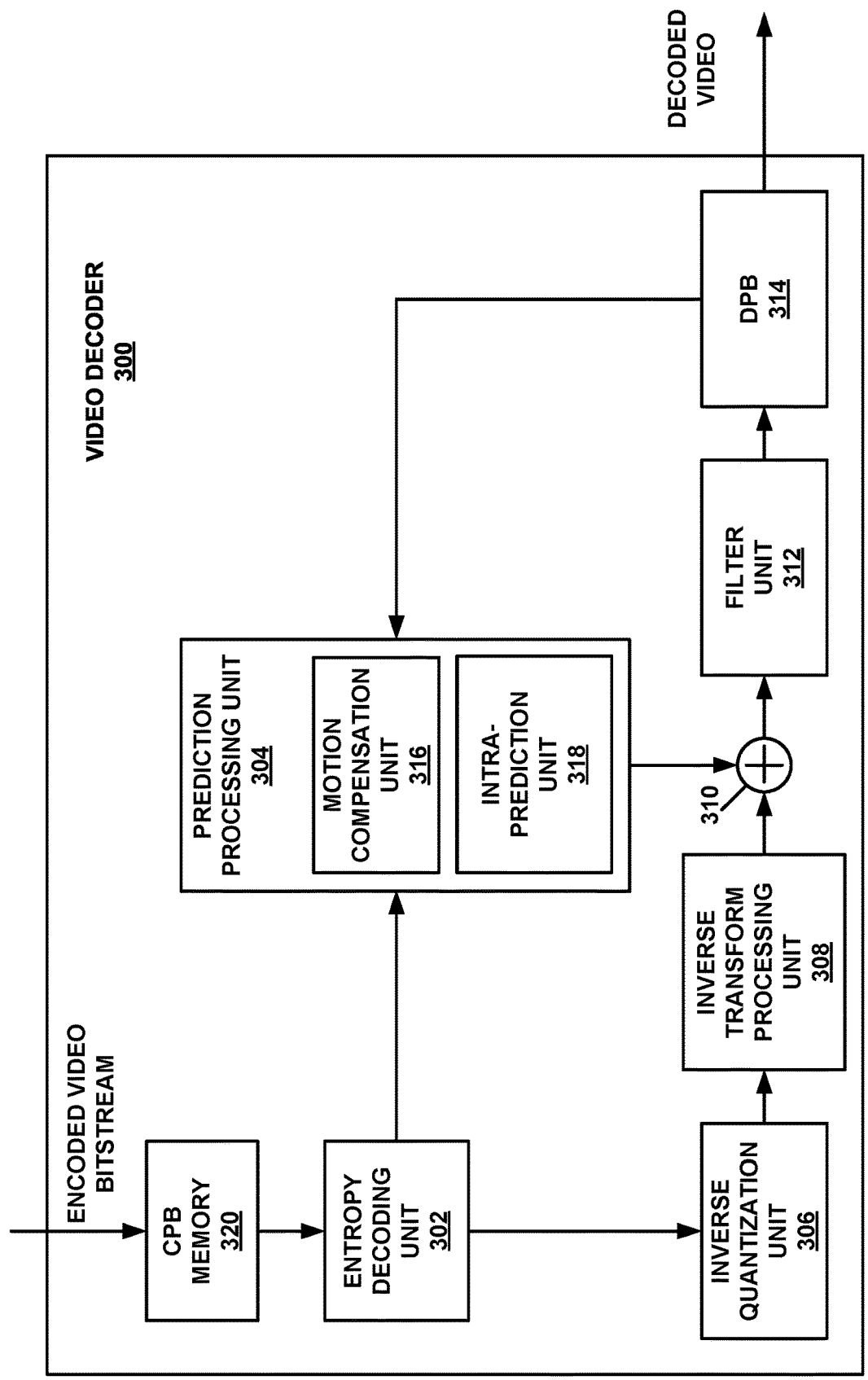
FIG. 14 is a block diagram illustrating an example video decoder that may perform the techniques of this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320 Likewise, memory 120 may store instructions to be executed by video decoder 300, when some or all of the functionality of video decoder 300 is implemented in software to be executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 13). In some examples, in performing the inter-prediction process, motion compensation unit 316 may perform the techniques of FIG. 12.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 13). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to control (e.g., reduce or limit) a bit length of input variables for a linear regression operation; apply the linear regression operation on controlled bit length input variables; derive an affine motion model based on the performing the linear regression operation; and decode a current block of the video data based on the affine motion model.

Figure 15:
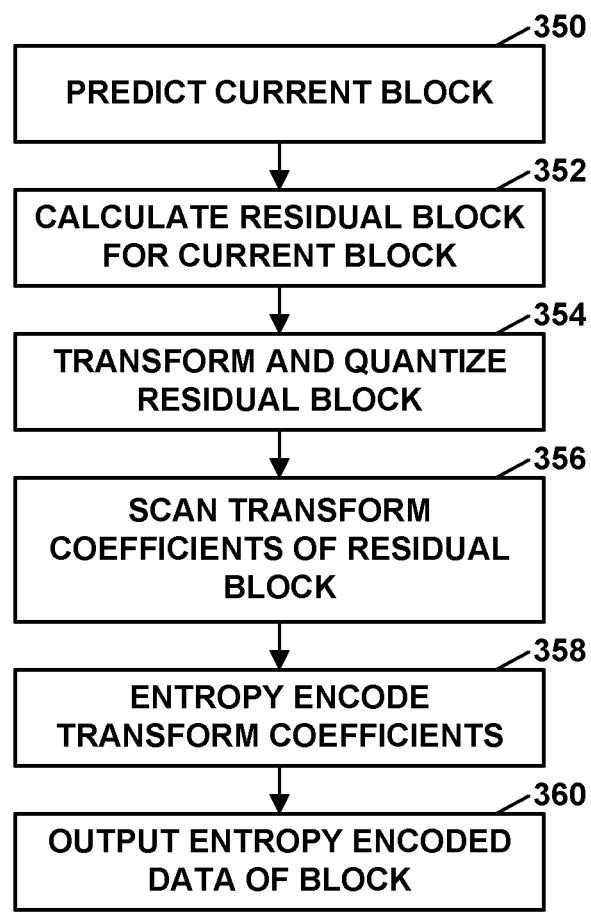
FIG. 15 is a flowchart illustrating an example method for encoding a current block in accordance with the techniques of this disclosure.

FIG. 15 is a flowchart illustrating an example method for encoding a current block in accordance with the techniques of this disclosure. The current block may be or include a current CU. Although described with respect to video encoder 200 (FIGS. 1 and 13), it should be understood that other devices may be configured to perform a method similar to that of FIG. 15.

In this example, video encoder 200 initially predicts the current block (350). For example, video encoder 200 may form a prediction block for the current block. When forming the prediction block, video encoder 200 (e.g., motion estimation unit 222) may perform the techniques of FIG. 12. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
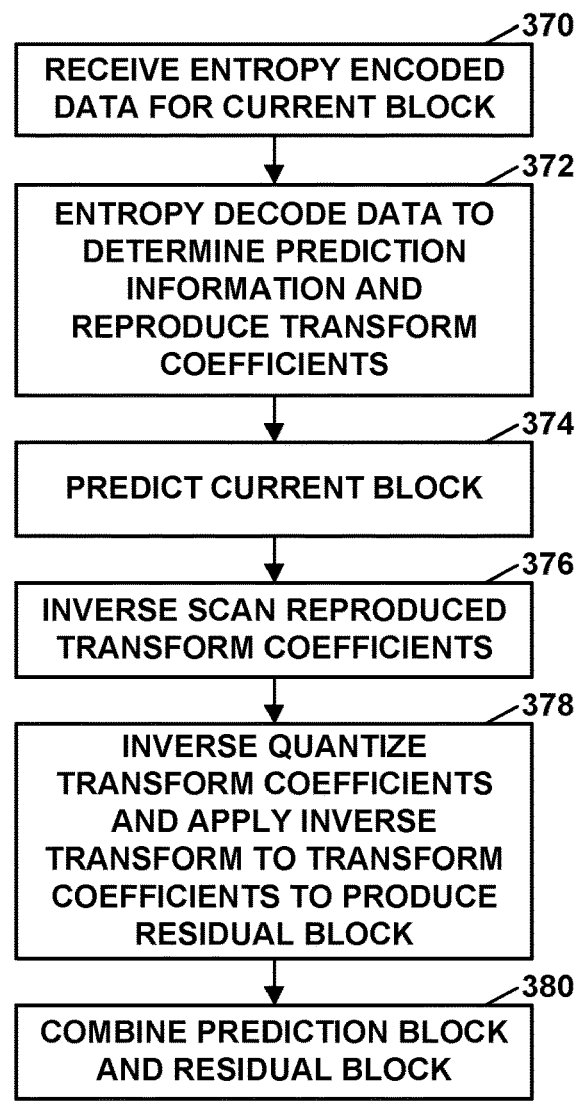
FIG. 16 is a flowchart illustrating an example method for decoding a current block in accordance with the techniques of this disclosure.

FIG. 16 is a flowchart illustrating an example method for decoding a current block of video data in accordance with the techniques of this disclosure. The current block may be or include a current CU. Although described with respect to video decoder 300 (FIGS. 1 and 14), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. When predicting the current block, video decoder 300 (e.g., motion compensation unit 316) may perform the techniques of FIG. 12. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

The following numbered clauses illustrate one or more aspects of the devices and techniques described in this disclosure.

Clause 1A. A method of coding video data, the method comprising: reducing a bit length of one or more input variables for a linear regression; performing the linear regression on the one or more input variables, the one or more input variables having the reduced bit length; deriving an affine motion model based on the performing the linear regression on the one or more input variables having the reduced bit length; and coding the video data based on the affine motion model.

Clause 2A. The method of clause 1A, further comprising determining affine motion information based on the affine motion model.

Clause 3A. The method of clause 2A, wherein the affine motion information comprises an affine motion candidate.

Clause 4A. The method of any of clauses 1A-3A, wherein the one or more input variables comprise at least one of delta coordinates, delta motion vectors, number of subblocks, or selected subblocks.

Clause 5A. The method of any of clauses 1A-4A, wherein reducing the bit length of the one or more input variable comprises: determining that at least one of a bit length of a value of a delta x or a value of a delta y is greater than a delta x delta y bit length threshold, wherein the value of the delta x comprises a value indicative of a distance in an x direction between a current subblock of a current block and an x anchor coordinate of the current block and wherein the value of the delta y comprises a value indicative of a distance in a y direction between the current subblock and a y anchor coordinate of the current block; and based on at least one of the bit lengths of the value of delta x or the value of delta y being greater than the delta x delta y bit length threshold, skip the current subblock as input to the one or more input variables for the linear regression.

Clause 6A. The method of clause 5A, wherein the delta x delta y bit length threshold is 8 bits.

Clause 7A. The method of any of clauses 1A-4A, wherein reducing the bit length of the one or more input variable comprises: determining that a bit length of a delta motion vector component is greater than a delta motion vector bit length threshold; and based on the bit length of the delta motion vector component being greater than the delta motion vector bit length threshold, skip the current subblock as input to the one or more input variables for the linear regression.

Clause 8A. The method of clause 7A, wherein the delta motion vector bit length threshold is 12 bits.

Clause 9A. The method of any of clauses 1A-8A, wherein reducing the bit length of the one or more input variable comprises reducing a number of subblocks used in the linear regression from at least one of a template area or a non-adjacent affine block, wherein the non-adjacent affine block is a block of the video data that is not adjacent to the current block and is coded using an affine mode.

Clause 10A. The method of any of clauses 1A-9A, wherein reducing the bit length of the one or more input variable comprises selecting a subset of subblocks of a current block of the video data for use as input to the one or more input variables for the linear regression, the subset of subblocks being less than a total number of subblocks within the current block.

Clause 11A. The method of any of clauses 1A-10A, further comprising reducing a bit length of one or more intermediate values of the linear interpolation.

Clause 12A. The method of clause 11A, wherein reducing a bit length of one or more intermediate values of the linear interpolation comprises right shifting a denominator and right shifting a numerator of an equation.

Clause 13A. The method of any of clauses 1A-12A, further comprising liming a bit length of one or more linear regression output parameters.

Clause 14A. The method of clause 13A, wherein liming a bit length of one or more linear regression output parameters comprises clipping the one or more linear regression output parameters.

Clause 15A. The method of clause 14A, wherein clipping the one or more linear regression output parameters comprises clipping each of the one or more linear regression output parameters to a same number of bits.

Clause 16A. The method of clause 14A, wherein clipping the one or more linear regression output parameters comprises clipping at least one parameter of the one or more linear regression output parameters to a different number of bits than other parameters of the one or more linear regression output parameters.

Clause 17A. The method of any of clauses 1A-16A, wherein coding comprises decoding.

Clause 18A. The method of any of clauses 1A-17A, wherein coding comprises encoding.

Clause 19A. A device for coding video data, the device comprising one or more means for performing the method of any of clauses 1A-18A.

Clause 20A. The device of clause 19A, wherein the one or more means comprise one or more processors implemented in circuitry.

Clause 21A. The device of any of clauses 19A or 20A, further comprising a memory to store the video data.

Clause 22A. The device of any of clauses 19A-21A, further comprising a display configured to display decoded video data.

Clause 23A. The device of any of clauses 19A-22A, wherein the device comprises one or more of a camera, a computer, a mobile device, a broadcast receiver device, or a set-top box.

Clause 24A. The device of any of clauses 19A-23A, wherein the device comprises a video decoder.

Clause 25A. The device of any of clauses 19A-24A, wherein the device comprises a video encoder.

Clause 26A. A computer-readable storage medium having stored thereon instructions that, when executed, cause one or more processors to perform the method of any of clauses 1A-18A.

Clause 1B. A method of coding video data, the method comprising: controlling a bit length of input variables for a linear regression operation, the input variables comprising at least one of a) one or more delta coordinates, b) one or more delta motion vectors, or c) a value representing a number of subblocks; performing the linear regression operation on controlled bit length input variables; deriving an affine motion model based on performing the linear regression operation; and coding a current block of the video data based on the affine motion model.

Clause 2B. The method of clause 1B, wherein controlling the bit length of the input variables comprises: determining that a bit length of at least one of a value of a delta x or a value of a delta y of one or more delta coordinates is greater than a delta x delta y bit length threshold, wherein the value of the delta x comprises a value indicative of a distance in an x direction between a current subblock of the current block and an x anchor coordinate of the current block and wherein the value of the delta y comprises a value indicative of a distance in a y direction between the current subblock and a y anchor coordinate of the current block, and based on the bit length of at least one of the value of delta x or the value of delta y being greater than the delta x delta y bit length threshold, skipping the current subblock as an input to the linear regression operation.

Clause 3B. The method of clause 2B, wherein the delta x delta y bit length threshold is 8 bits.

Clause 4B. The method of any of clauses 1B-3B, wherein controlling the bit length of the input variables comprises: determining that a bit length of a delta motion vector component is greater than a delta motion vector bit length threshold; and based on the bit length of the delta motion vector component being greater than the delta motion vector bit length threshold, skipping a current subblock as input to the linear regression operation.

Clause 5B. The method of any of clauses 1B-3B, wherein controlling the bit length of the input variables comprises: determining that a bit length of a delta motion vector component is greater than a delta motion vector bit length threshold; and based on the bit length of the delta motion vector component being greater than the delta motion vector bit length threshold, clipping to the delta motion vector component to a length of the delta motion vector bit length threshold.

Clause 6B. The method of clause 5B, wherein the delta motion vector bit length threshold is 12 bits.

Clause 7B. The method of any of clauses 1B-3B, wherein controlling the bit length of the input variables comprises: determining whether a bit length of a delta motion vector component is greater than a first delta motion vector bit length threshold or smaller than a second delta motion vector bit length threshold; and based on a determination that the bit length of the delta motion vector component is greater than the first delta motion vector bit length threshold or smaller than the second delta motion vector bit length threshold, using a substitute delta motion vector component in place of the delta motion vector component as input to the linear regression operation, the substitute delta motion vector component having a bit length less than the delta motion vector component.

Clause 8B. The method of any of clauses 1B-7B, wherein controlling the bit length of the input variables comprises reducing a bit length of a value representing a number of subblocks used in the linear regression operation to a predetermined bit length.

Clause 9B. The method of clause 8B, wherein the predetermined bit length is 8 bits.

Clause 10B. The method of clause 8B or 9B, controlling the bit length of the input variables comprises selecting a subset of subblocks of a current block of the video data for use in the linear regression operation, the subset of subblocks being less than a total number of subblocks within the current block, and wherein the method further comprises: determining a first number of subblocks within a template area; and determining a second number of subblocks within a non-adjacent affine block, wherein the non-adjacent affine block is a block of the video data that is not adjacent to the current block and is coded using an affine mode.

Clause 11B. The method of clause 10B, wherein the first number comprises M/2 and the second number comprises M/2, where M represents the number of subblocks used in the linear regression operation.

Clause 12B. The method of clause 10B, wherein the first number comprises M/4 and the second number comprises M−M/4, where M represents the number of subblocks used in the linear regression operation.

Clause 13B. The method of clause 10B, further comprising: determining T, a maximum number of allowed sub-blocks for the template area; and determining T', a number of available sub-blocks from template area, wherein the first number, S, equals min(T, T') and the second number equals M−S, where M represents the number of subblocks used in the linear regression operation.

Clause 14B. The method of any of clauses 10B-13B, wherein selecting the subset of subblocks comprises selecting sub-blocks in scan order.

Clause 15B. The method of any of clauses 10B-13B, wherein selecting the subset of subblocks comprises sub-sampling using a predetermined sub-sample ratio.

Clause 16B. The method of any of clauses 10B-13B, wherein selecting the subset of subblocks comprises: sub-sampling subblocks in the template area using a predetermined sub-sample ratio; and selecting non-adjacent affine sub-blocks in scan order until a number of selected sub-blocks equals the second number.

Clause 17B. The method of any of clauses 10B-13B, wherein selecting the subset of subblocks comprises: determining whether at least one of a height or a width of a current CU of the current block is equal to 256; based on a determination that at least one of the height or the width of the current CU is equal to 256, performing sub-sampling in at least one of a horizontal template row scan of the template area or a vertical template column scan of the template area with a sub-sampling ratio of ½; determining a total number, T, of subblocks of the template area; determining whether a total number of available non-adjacent affine subblocks is greater than 255−T; and based on a determination that the total number of available non-adjacent affine subblocks is greater than 255−T, using a first 255−T available non-adjacent affine subblocks in raster scan order as input for the linear regression operation.

Clause 18B. The method of any of clauses 1B-17B, further comprising limiting a bit length of one or more linear regression operation output parameters.

Clause 19B. The method of clause 18B, wherein liming a bit length of one or more linear regression operation output parameters comprises clipping the one or more linear regression operation output parameters.

Clause 20B. The method of clause 19B, wherein clipping the one or more linear regression operation output parameters comprises clipping each of the one or more linear regression operation output parameters to a same number of bits.

Clause 21B. The method of clause 19B, wherein clipping the one or more linear regression operation output parameters comprises clipping at least one parameter of the one or more linear regression operation output parameters to a different number of bits than other parameters of the one or more linear regression operation output parameters.

Clause 22B. The method of clause 21B, wherein clipping the at least one parameter of the one or more linear regression operation output parameters to the different number of bits than other parameters of the one or more linear regression operation output parameters comprises: clipping a first linear regression operation output parameter to a range of $[-(1\ll(M+N)), (1\ll(M+N))-1]$; and clipping a second linear regression operation output parameter and a third linear regression operation output parameter to a range of $[-(1\ll(M-1)), (1\ll(M-1))-1$, where M=12 and N=8.

Clause 23B. The method of any of clauses 1B-22B, further comprising determining an affine motion candidate based on the affine motion model.

Clause 24B. A device for coding video data, the device comprising: memory configured to store the video data; and one or more processors communicatively coupled to the memory, the one or more processors being configured to: control a bit length of input variables for a linear regression operation, the input variables comprising at least one of a) one or more delta coordinates, b) one or more delta motion vectors, or c) a value representing a number of subblocks; perform the linear regression operation on controlled bit length input variables; derive an affine motion model based on the performing the linear regression operation; and code a current block of the video data based on the affine motion model.

Clause 25B. The device of clause 24B, wherein as part of controlling the bit length of the input variables, the one or more processors are configured to: determine that a bit length of at least one of a value of a delta x or a value of a delta y of one or more delta coordinates is greater than a delta x delta y bit length threshold, wherein the value of the delta x comprises a value indicative of a distance in an x direction between a current subblock of the current block and an x anchor coordinate of the current block and wherein the value of the delta y comprises a value indicative of a distance in a y direction between the current subblock and a y anchor coordinate of the current block; and based on the bit length of at least one of the value of delta x or the value of delta y being greater than the delta x delta y bit length threshold, skip the current subblock as an input to the linear regression operation.

Clause 26B. The device of clause 25B, wherein the delta x delta y bit length threshold is 8 bits.

Clause 27B. The device of any of clauses 24B-26B, wherein as part of controlling the bit length of the input variables, the one or more processors are configured to: determine that a bit length of a delta motion vector component is greater than a delta motion vector bit length threshold; and based on the bit length of the delta motion vector component being greater than the delta motion vector bit length threshold, skip a current subblock as input to the linear regression operation.

Clause 28B. The device of any of clauses 24B-26B, wherein as part of controlling the bit length of the input variables, the one or more processors are configured to: determine that a bit length of a delta motion vector component is greater than a delta motion vector bit length threshold; and based on the bit length of the delta motion vector component being greater than the delta motion vector bit length threshold, clip to the delta motion vector component to a length of the delta motion vector bit length threshold.

Clause 29B. The device of clause 28B, wherein the delta motion vector bit length threshold is 12 bits.

Clause 30B. The device of any of clauses 24B-26B, wherein as part of controlling the bit length of the input variables, the one or more processors are configured to: determine whether a bit length of a delta motion vector component is greater than a first delta motion vector bit length threshold or smaller than a second delta motion vector bit length threshold; and based on a determination that the bit length of the delta motion vector component is greater than the first delta motion vector bit length threshold or smaller than the second delta motion vector bit length threshold, use a substitute delta motion vector component in place of the delta motion vector component as input to the linear regression operation, the substitute delta motion vector component having a bit length less than the delta motion vector component.

Clause 31B. The device of any of clauses 24B-30B, wherein as part of controlling the bit length of the input variables, the one or more processors are configured to reduce a bit length of a value representing a number of subblocks used in the linear regression operation to a predetermined bit length.

Clause 32B. The device of clause 31B, wherein the predetermined bit length is 8 bits.

Clause 33B. The device of clause 31B or clause 32B, wherein as part of controlling the bit length of the input variables, the one or more processors are configured to select a subset of subblocks of a current block of the video data for use as input to the one or more input variables for the linear regression operation, the subset of subblocks being less than a total number of subblocks within the current block, and wherein the one or more processors are further configured to: determine a first number of subblocks within a template area; and determine a second number of subblocks within a non-adjacent affine block, wherein the non-adjacent affine block is a block of the video data that is not adjacent to the current block and is coded using an affine mode.

Clause 34B. The device of clause 33B, wherein the first number comprises M/2 and the second number comprises M/2, where M represents the number of subblocks used in the linear regression operation.

Clause 35B. The device of clause 33B, wherein the first number comprises M/4 and the second number comprises M-M/4, where M represents the number of subblocks used in the linear regression operation.

Clause 36B. The device of clause 33B, wherein the one or more processors are further configured to: determine T, a maximum number of allowed sub-blocks for the template area; and determine T', a number of available sub-blocks from template area, wherein the first number, S, equals min(T, T') and the second number equals M−S, where M represents the number of subblocks used in the linear regression operation.

Clause 37B. The device of any of clauses 33B-36B, wherein as part of selecting the subset of subblocks, the one or more processors are configured to select sub-blocks in scan order.

Clause 38B. The device of any of clauses 33B-36B, wherein as part of selecting the subset of subblocks, the one or more processors are configured to sub-sample using a predetermined sub-sample ratio.

Clause 39B. The device of any of clauses 33B-36B, wherein as part of selecting the subset of subblocks, the one or more processors are configured to: sub-sample subblocks in the template area using a predetermined sub-sample ratio; and select non-adjacent affine sub-blocks in scan order until a number of selected sub-blocks equals the second number.

Clause 40B. The device of any of clauses 33B-36B, wherein as part of selecting the subset of subblocks, the one or more processors are configured to: determine whether at least one of a height or a width of a current CU of the current block is equal to 256; based on a determination that at least one of the height or the width of the current CU is equal to 256, perform sub-sampling in at least one of a horizontal template row scan of the template area or a vertical template column scan of the template area with a sub-sampling ratio of ½; determine a total number, T, of subblocks of the template area; determine whether a total number of available non-adjacent affine subblocks is greater than 255−T; and based on a determination that the total number of available non-adjacent affine subblocks is greater than 255−T, use a first 255−T available non-adjacent affine subblocks in raster scan order as input for the linear regression operation.

Clause 41B. The device of any of clauses 24B-40B, wherein the one or more processors are further configured to limit a bit length of one or more linear regression operation output parameters.

Clause 42B. The device of clause 41B, wherein as part of liming a bit length of one or more linear regression operation output parameters, the one or more processors are configured to clip the one or more linear regression operation output parameters.

Clause 43B. The device of clause 42B, wherein as part of clipping the one or more linear regression operation output parameters, the one or more processors are configured to clip each of the one or more linear regression operation output parameters to a same number of bits.

Clause 44B. The device of clause 42B, wherein as part of clipping the one or more linear regression operation output parameters, the one or more processors are configured to clip at least one parameter of the one or more linear regression operation output parameters to a different number of bits than other parameters of the one or more linear regression operation output parameters.

Clause 45B. The device of clause 44B, wherein as part of clipping the at least one parameter of the one or more linear regression operation output parameters to the different number of bits than other parameters of the one or more linear regression operation output parameters, the one or more processors are configured to: clip a first linear regression operation output parameter to a range of $[-(1\ll(M+N)), (1\ll(M+N))-1]$; and clip a second linear regression operation output parameter and a third linear regression operation output parameter to a range of $[-(1\ll(M-1)), (1\ll(M-1))-1$, where M=12 and N=8.

Clause 46B. The device of any of clauses 24B-45B, wherein the one or more processors are further configured to determine an affine motion candidate based on the affine motion model.

Clause 47B. The device of any of clauses 24B-46B, further comprising a display configured to display decoded video data.

Clause 48B. The device of any of clauses 24B-47B, wherein the device comprises one or more of a camera, a computer, a mobile device, a broadcast receiver device, or a set-top box.

Clause 49B. Non-transitory computer-readable storage media having stored thereon instructions that, when executed, cause one or more processors to: control a bit length of input variables for a linear regression operation to generate one or more reduced bit length input variables, the input variables comprising at least one of a) one or more delta coordinates, b) one or more delta motion vectors, or c) a value representing a number of subblocks; perform the linear regression operation on controlled bit length input variables; derive an affine motion model based on the performing the linear regression operation; and code a current block of video data based on the affine motion model.

Clause 50B. A device for coding video data, the device comprising: means for controlling a bit length of input variables for a linear regression operation to generate one or more reduced bit length input variables, the one or more input variables comprising at least one of a) one or more delta coordinates, b) one or more delta motion vectors, or c) a value representing a number of subblocks; means for performing the linear regression operation on controlled bit length input variables; means for deriving an affine motion model based on performing the linear regression operation; and means for coding a current block of the video data based on the affine motion model.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
controlling a bit length of input variables for a linear regression operation, the input variables comprising at least one of a) one or more delta coordinates, b) one or more delta motion vectors, or c) a value representing a number of subblocks;
performing the linear regression operation on controlled bit length input variables;
deriving an affine motion model based on performing the linear regression operation; and
coding a current block of the video data based on the affine motion model.

2. The method of claim 1, wherein controlling the bit length of the input variables comprises:
determining that a bit length of at least one of a value of a delta x or a value of a delta y of one or more delta coordinates is greater than a delta x delta y bit length threshold, wherein the value of the delta x comprises a value indicative of a distance in an x direction between a current subblock of the current block and an x anchor coordinate of the current block and wherein the value of the delta y comprises a value indicative of a distance in a y direction between the current subblock and a y anchor coordinate of the current block, and based on the bit length of at least one of the value of delta x or the value of delta y being greater than the delta x delta y bit length threshold, skipping the current subblock as an input to the linear regression operation.

3. The method of claim 2, wherein the delta x delta y bit length threshold is 8 bits.

4. The method of claim 1, wherein controlling the bit length of the input variables comprises:

determining that a bit length of a delta motion vector component is greater than a delta motion vector bit length threshold; and based on the bit length of the delta motion vector component being greater than the delta motion vector bit length threshold, skipping a current subblock as input to the linear regression operation.

5. The method of claim 1, wherein controlling the bit length of the input variables comprises:

determining that a bit length of a delta motion vector component is greater than a delta motion vector bit length threshold; and based on the bit length of the delta motion vector component being greater than the delta motion vector bit length threshold, clipping to the delta motion vector component to a length of the delta motion vector bit length threshold.

6. The method of claim 5, wherein the delta motion vector bit length threshold is 12 bits.

7. The method of claim 1, wherein controlling the bit length of the input variables comprises:

determining whether a bit length of a delta motion vector component is greater than a first delta motion vector bit length threshold or smaller than a second delta motion vector bit length threshold; and based on a determination that the bit length of the delta motion vector component is greater than the first delta motion vector bit length threshold or smaller than the second delta motion vector bit length threshold, using a substitute delta motion vector component in place of the delta motion vector component as input to the linear regression operation, the substitute delta motion vector component having a bit length less than the delta motion vector component.

8. The method of claim 1, wherein controlling the bit length of the input variables comprises reducing a bit length of a value representing a number of subblocks used in the linear regression operation to a predetermined bit length.

9. The method of claim 8, wherein the predetermined bit length is 8 bits.

10. The method of claim 8, wherein controlling the bit length of the input variables comprises selecting a subset of subblocks of a current block of the video data for use in the linear regression operation, the subset of subblocks being less than a total number of subblocks within the current block, and wherein the method further comprises:

determining a first number of subblocks within a template area; and determining a second number of subblocks within a non-adjacent affine block, wherein the non-adjacent affine block is a block of the video data that is not adjacent to the current block and is coded using an affine mode.

11. The method of claim 10, wherein the first number comprises M/2 and the second number comprises M/2, where M represents the number of subblocks used in the linear regression operation.

12. The method of claim 10, wherein the first number comprises M/4 and the second number comprises M−M/4, where M represents the number of subblocks used in the linear regression operation.

13. The method of claim 10, further comprising:

determining T, a maximum number of allowed sub-blocks for the template area; and determining T', a number of available sub-blocks from template area, wherein the first number, S, equals min(T, T') and the second number equals M−S, where M represents the number of subblocks used in the linear regression operation.

14. The method of claim 10, wherein selecting the subset of subblocks comprises selecting sub-blocks in scan order.

15. The method of claim 10, wherein selecting the subset of subblocks comprises sub-sampling using a predetermined sub-sample ratio.

16. The method of claim 10, wherein selecting the subset of subblocks comprises:

sub-sampling subblocks in the template area using a predetermined sub-sample ratio; and selecting non-adjacent affine sub-blocks in scan order until a number of selected sub-blocks equals the second number.

17. The method of claim 10, wherein selecting the subset of subblocks comprises:

determining whether at least one of a height or a width of a current CU of the current block is equal to 256;

based on a determination that at least one of the height or the width of the current CU is equal to 256, performing sub-sampling in at least one of a horizontal template row scan of the template area or a vertical template column scan of the template area with a sub-sampling ratio of ½;

determining a total number, T, of subblocks of the template area;

determining whether a total number of available non-adjacent affine subblocks is greater than 255−T; and based on a determination that the total number of available non-adjacent affine subblocks is greater than 255−T, using a first 255−T available non-adjacent affine subblocks in raster scan order as input for the linear regression operation.

18. The method of claim 1, further comprising limiting a bit length of one or more linear regression operation output parameters.

19. The method of claim 18, wherein liming a bit length of one or more linear regression operation output parameters comprises clipping the one or more linear regression operation output parameters.

20. The method of claim 19, wherein clipping the one or more linear regression operation output parameters comprises clipping each of the one or more linear regression operation output parameters to a same number of bits.

21. The method of claim 19, wherein clipping the one or more linear regression operation output parameters comprises clipping at least one parameter of the one or more linear regression operation output parameters to a different number of bits than other parameters of the one or more linear regression operation output parameters.

22. The method of claim 21, wherein clipping the at least one parameter of the one or more linear regression operation output parameters to the different number of bits than other parameters of the one or more linear regression operation output parameters comprises:
  clipping a first linear regression operation output parameter to a range of [−(1«(M+N)), (1«(M+N))−1]; and
  clipping a second linear regression operation output parameter and a third linear regression operation output parameter to a range of [−(1«(M−1)), (1«(M−1))−1, where M=12 and N=8.

23. The method of claim 1, further comprising determining an affine motion candidate based on the affine motion model.

24. A device for coding video data, the device comprising: memory configured to store the video data; and
  one or more processors communicatively coupled to the memory, the one or more processors being configured to:
    control a bit length of input variables for a linear regression operation, the input variables comprising at least one of a) one or more delta coordinates, b) one or more delta motion vectors, or c) a value representing a number of subblocks;
    perform the linear regression operation on controlled bit length input variables;
    derive an affine motion model based on the performing the linear regression operation; and
    code a current block of the video data based on the affine motion model.

25. The device of claim 24, wherein as part of controlling the bit length of the input variables, the one or more processors are configured to:
  determine that a bit length of at least one of a value of a delta x or a value of a delta y of one or more delta coordinates is greater than a delta x delta y bit length threshold, wherein the value of the delta x comprises a value indicative of a distance in an x direction between a current subblock of the current block and an x anchor coordinate of the current block and wherein the value of the delta y comprises a value indicative of a distance in a y direction between the current subblock and a y anchor coordinate of the current block; and
  based on the bit length of at least one of the value of delta x or the value of delta y being greater than the delta x delta y bit length threshold, skip the current subblock as an input to the linear regression operation.

26. The device of claim 25, wherein the delta x delta y bit length threshold is 8 bits.

27. The device of claim 24, wherein as part of controlling the bit length of the input variables, the one or more processors are configured to:
  determine that a bit length of a delta motion vector component is greater than a delta motion vector bit length threshold; and
  based on the bit length of the delta motion vector component being greater than the delta motion vector bit length threshold, skip a current subblock as input to the linear regression operation.

28. The device of claim 24, wherein as part of controlling the bit length of the input variables, the one or more processors are configured to:
  determine that a bit length of a delta motion vector component is greater than a delta motion vector bit length threshold; and
  based on the bit length of the delta motion vector component being greater than the delta motion vector bit length threshold, clip to the delta motion vector component to a length of the delta motion vector bit length threshold.

29. The device of claim 28, wherein the delta motion vector bit length threshold is 12 bits.

30. The device of claim 24, wherein as part of controlling the bit length of the input variables, the one or more processors are configured to:
  determine whether a bit length of a delta motion vector component is greater than a first delta motion vector bit length threshold or smaller than a second delta motion vector bit length threshold; and
  based on a determination that the bit length of the delta motion vector component is greater than the first delta motion vector bit length threshold or smaller than the second delta motion vector bit length threshold, use a substitute delta motion vector component in place of the delta motion vector component as input to the linear regression operation, the substitute delta motion vector component having a bit length less than the delta motion vector component.

31. The device of claim 24, wherein as part of controlling the bit length of the input variables, the one or more processors are configured to reduce a bit length of a value representing a number of subblocks used in the linear regression operation to a predetermined bit length.

32. The device of claim 31, wherein the predetermined bit length is 8 bits.

33. The device of claim 31, wherein as part of controlling the bit length of the input variables, the one or more processors are configured to select a subset of subblocks of a current block of the video data for use as input to the one or more input variables for the linear regression operation, the subset of subblocks being less than a total number of subblocks within the current block, and wherein the one or more processors are further configured to:
  determine a first number of subblocks within a template area; and
  determine a second number of subblocks within a non-adjacent affine block, wherein the non-adjacent affine block is a block of the video data that is not adjacent to the current block and is coded using an affine mode.

34. The device of claim 33, wherein the first number comprises M/2 and the second number comprises M/2, where M represents the number of subblocks used in the linear regression operation.

35. The device of claim 33, wherein the first number comprises M/4 and the second number comprises M−M/4, where M represents the number of subblocks used in the linear regression operation.

36. The device of claim 33, wherein the one or more processors are further configured to:
  determine T, a maximum number of allowed sub-blocks for the template area; and
  determine T', a number of available sub-blocks from template area, wherein the first number, S, equals min(T, T') and the second number equals M−S, where M represents the number of subblocks used in the linear regression operation.

37. The device of claim 33, wherein as part of selecting the subset of subblocks, the one or more processors are configured to select sub-blocks in scan order.

38. The device of claim 33, wherein as part of selecting the subset of subblocks, the one or more processors are configured to sub-sample using a predetermined sub-sample ratio.

39. The device of claim 33, wherein as part of selecting the subset of subblocks, the one or more processors are configured to:
sub-sample subblocks in the template area using a pre-determined sub-sample ratio; and
select non-adjacent affine sub-blocks in scan order until a number of selected sub-blocks equals the second number.

40. The device of claim 33, wherein as part of selecting the subset of subblocks, the one or more processors are configured to:
determine whether at least one of a height or a width of a current CU of the current block is equal to 256;
based on a determination that at least one of the height or the width of the current CU is equal to 256, perform sub-sampling in at least one of a horizontal template row scan of the template area or a vertical template column scan of the template area with a sub-sampling ratio of ½;
determine a total number, T, of subblocks of the template area;
determine whether a total number of available non-adjacent affine subblocks is greater than 255−T; and
based on a determination that the total number of available non-adjacent affine subblocks is greater than 255−T, use a first 255−T available non-adjacent affine sub-blocks in raster scan order as input for the linear regression operation.

41. The device of claim 24, wherein the one or more processors are further configured to limit a bit length of one or more linear regression operation output parameters.

42. The device of claim 41, wherein as part of liming a bit length of one or more linear regression operation output parameters, the one or more processors are configured to clip the one or more linear regression operation output parameters.

43. The device of claim 42, wherein as part of clipping the one or more linear regression operation output parameters, the one or more processors are configured to clip each of the one or more linear regression operation output parameters to a same number of bits.

44. The device of claim 42, wherein as part of clipping the one or more linear regression operation output parameters, the one or more processors are configured to clip at least one parameter of the one or more linear regression operation output parameters to a different number of bits than other parameters of the one or more linear regression operation output parameters.

45. The device of claim 44, wherein as part of clipping the at least one parameter of the one or more linear regression operation output parameters to the different number of bits than other parameters of the one or more linear regression operation output parameters, the one or more processors are configured to:
clip a first linear regression operation output parameter to a range of $[-(1\ll(M+N)), (1\ll(M+N))-1]$; and
clip a second linear regression operation output parameter and a third linear regression operation output parameter to a range of $[-(1\ll(M-1)), (1\ll(M-1))-1$,
where M=12 and N=8.

46. The device of claim 24, wherein the one or more processors are further configured to determine an affine motion candidate based on the affine motion model.

47. The device of claim 24, further comprising a display configured to display decoded video data.

48. The device of claim 24, wherein the device comprises one or more of a camera, a computer, a mobile device, a broadcast receiver device, or a set-top box.

49. Non-transitory computer-readable storage media having stored thereon instructions that, when executed, cause one or more processors to:
control a bit length of input variables for a linear regression operation to generate one or more reduced bit length input variables, the input variables comprising at least one of a) one or more delta coordinates, b) one or more delta motion vectors, or c) a value representing a number of subblocks;
perform the linear regression operation on controlled bit length input variables;
derive an affine motion model based on the performing the linear regression operation; and
code a current block of video data based on the affine motion model.

50. A device for coding video data, the device comprising:
means for controlling a bit length of input variables for a linear regression operation to generate one or more reduced bit length input variables, the one or more input variables comprising at least one of a) one or more delta coordinates, b) one or more delta motion vectors, or c) a value representing a number of sub-blocks;
means for performing the linear regression operation on controlled bit length input variables;
means for deriving an affine motion model based on performing the linear regression operation; and
means for coding a current block of the video data based on the affine motion model.

* * * * *